(12) United States Patent
Van Og et al.

(10) Patent No.: US 10,415,316 B2
(45) Date of Patent: Sep. 17, 2019

(54) APPARATUS AND METHOD FOR DRILLING A DIRECTIONAL BOREHOLE IN THE GROUND

(71) Applicant: HUISMAN WELL TECHNOLOGY, Schiedam (NL)

(72) Inventors: Gerardus Godefridus Johannes Van Og, Schiedam (NL); Pieter Dirk Melis Van Duivendijk, Schiedam (NL); Joop Roodenburg, Schiedam (NL)

(73) Assignee: HUISMAN WELL TECHNOLOGY, Schiedam (NL)

( * ) Notice: Subject to any disclaimer, the term of this patent is extended or adjusted under 35 U.S.C. 154(b) by 101 days.

(21) Appl. No.: 15/545,241

(22) PCT Filed: Jan. 21, 2016

(86) PCT No.: PCT/NL2016/050048
§ 371 (c)(1),
(2) Date: Jul. 20, 2017

(87) PCT Pub. No.: WO2016/118008
PCT Pub. Date: Jul. 28, 2016

(65) Prior Publication Data
US 2018/0010390 A1  Jan. 11, 2018

(30) Foreign Application Priority Data
Jan. 21, 2015  (NL) ..................................... 2014169

(51) Int. Cl.
*E21B 7/06*  (2006.01)
*E21B 7/20*  (2006.01)
(Continued)

(52) U.S. Cl.
CPC .............. *E21B 7/208* (2013.01); *E21B 7/067* (2013.01); *E21B 7/068* (2013.01); *E21B 10/60* (2013.01); *E21B 10/64* (2013.01); *E21B 44/00* (2013.01)

(58) Field of Classification Search
CPC ........... E21B 7/068; E21B 7/067; E21B 7/208
See application file for complete search history.

(56) References Cited

U.S. PATENT DOCUMENTS

| 4,655,299 A | * | 4/1987 | Schoeffler | ............... E21B 7/067 175/38 |
| 2005/0150690 A1 | | 7/2005 | Moriarty | |
| 2005/0236187 A1 | | 10/2005 | Chen et al. | |

FOREIGN PATENT DOCUMENTS

| WO | 2 409 220 A | 6/2005 |
| WO | WO 2013/100769 A1 | 7/2013 |
| WO | WO 2014/098842 A1 | 6/2014 |

OTHER PUBLICATIONS

Dutch Search Report, issued in priority application No. 2014169, dated Sep. 18, 2015.
(Continued)

*Primary Examiner* — Kristyn A Hall
(74) *Attorney, Agent, or Firm* — Birch, Stewart, Kolasch & Birch, LLP

(57) ABSTRACT

A directional casing drilling system includes a casing string, a drilling rig and a retrievable Bottom Hole Assembly (BHA). The drilling rig includes a casing drive for rotating the casing string in the borehole, a control system for controlling the casing drive, and a mud pump for pumping a continuous flow of drilling mud into the casing string. The BHA includes a torque transfer section, with which it is secured in the casing string, and a drill bit section held in a drilling position in the torque transfer section. It further includes a mud drive that rotates the drilling position of the
(Continued)

drill bit section about the longitudinal axis of the torque transfer section, and a communicating device for communicating the orientation of the drill bit to the control system. The BHA is steered by adjusting the rotational speed of the casing string.

18 Claims, 7 Drawing Sheets

(51) Int. Cl.
 *E21B 10/64* (2006.01)
 *E21B 10/60* (2006.01)
 *E21B 44/00* (2006.01)

(56) References Cited

OTHER PUBLICATIONS

International Search Report, issued in PCT/NL2016/050048, dated Jun. 10, 2016.
Written Opinion of the International Searching Authority, issued in PCT/NL2016/050048, dated Jun. 10, 2016.

\* cited by examiner

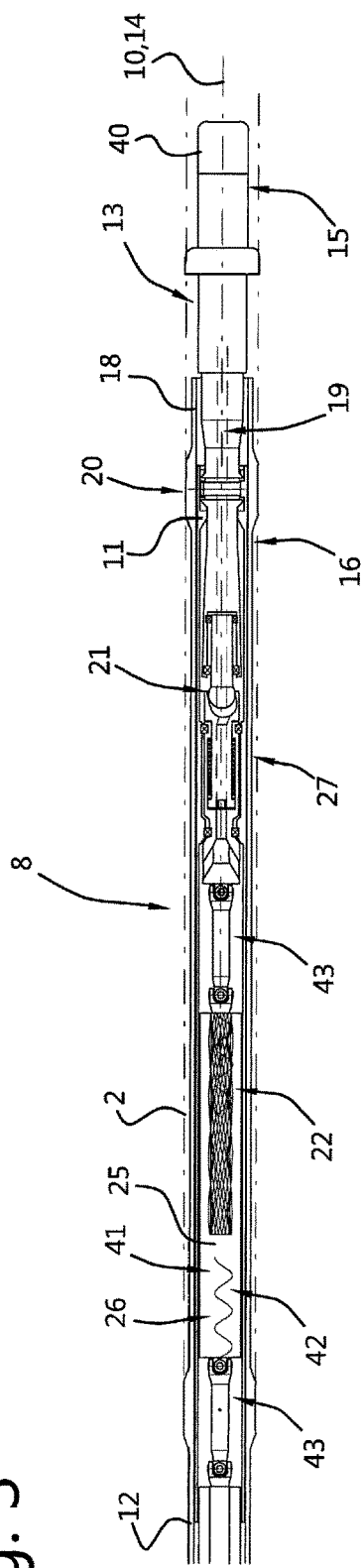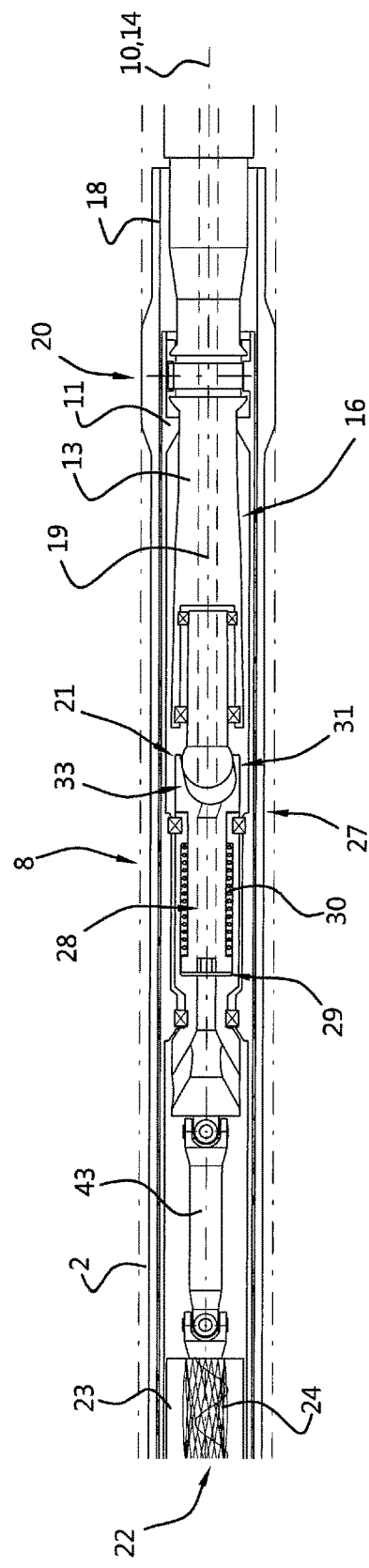

APPARATUS AND METHOD FOR DRILLING A DIRECTIONAL BOREHOLE IN THE GROUND

FIELD AND BACKGROUND OF THE INVENTION

This invention relates to an apparatus and a method for drilling a directional borehole in the ground.

Directional drilling is used for example for drilling oil and gas wells, boreholes for collection geothermal energy, or boreholes for installing a subterranean duct under a channel or other structure. With directional drilling a steerable drilling unit, or bottom hole assembly (BHA), is used for drilling the borehole. Typically, a BHA comprises a drive, a drilling bit and instruments for registration of the position of the drill bit. Several techniques can be used.

With the bent housing drilling technique, the BHA is provided with a bent housing such that the drill bit extends at an angle relative to the longitudinal axis of the BHA. This drilling position of the drill bit relative to the BHA is fixed. The BHA is connected to a drilling string for pushing the BHA forward and for rotating the BHA about its longitudinal axis. The drilling bit is typically driven by a mud drive. The drilling string is used for rotating the BHA such that the drill bit is positioned at the desired drilling direction. When the drilling string is stopped rotating, the BHA and its drill bit hold their position and the BHA drills a curved borehole. By rotating the BHA during the drilling process, the drilling bit is rotated about the longitudinal axis of the BHA and is thus not directed at any particular angle, therefore the BHA will drill a straight borehole.

An alternative is the rotary steerable technique. Also in this technique, the drill bit, mounted on a drill bit section, extends at an angled drilling position relative to a base section, also referred to as torque transfer section, of the BHA. However, the position of the drill bit relative to the base section can be adjusted, more in particular: the drill bit can be rotated about the longitudinal axis of the base section of the BHA while maintaining its angled drilling position relative to that longitudinal axis. The BHA is provided with a drive system for regulating the rotational speed of the drill bit section relative to the base section of the BHA. By continuously rotating the drilling position of the drill bit in a direction contrary to the rotation of the drill string and at the same rotational speed as the drill string, the drill bit is effectively kept in a constant drilling position relative to the borehole, and a curved borehole section will be drilled. When the drilling position of the drill bit is rotated at a rotational speed that differs from the rotational speed of the base section of the BHA, the drill bit is not kept in a constant drilling position relative to the borehole, thus, a linear borehole is drilled.

A major advantage of the rotary steerable technique over the bent housing technique is that the drilling string can be rotated while drilling a linear borehole. Rotating the drill string while drilling reduces the chances of the stick slip. Also, pushing the drill string forward takes less effort when the drill string is rotated at the same time. The rotary steerable therefore is a more efficient drilling technique.

With the rotary steerable technique, the drill string is rotated from the surface, and downhole devices cause the drill bit to drill the desired direction. Therefore, the BHA used in the rotary steerable technique is a more complicated than the BHA used with the bent housing drilling technique. With the rotary steerable technique, the BHA typically includes an internal orientating and control mechanism that counter-rotates relative to the drill string. This internal mechanism controls the speed at which the drilling position of the drill bit is rotated relative to the BHA, and thus controls the rotational position of the drilling position of the drill bit relative to the borehole. For example a controlled system is provided to control a mud drive, which mud drive rotates the drilling position of the drilling bit relative to the BHA and borehole. Typically, BHA comprises control valves that are used by a downhole control mechanism to regulate the flow of drilling mud passing through the mud drive, to thus regulate the rotational speed of the mud drive and control the position of the drilling bit, i.e. control the rotation of the drilling position of the drill bit.

The rotary steerable technique can be subdivided into two main groups regarding the way the drilling position of the drill bit is rotated relative to the BHA. The first group is the group of the point the bit systems, which use an internal eccentric part to position the drill bit section. The second group is the group of the push the bit systems, which systems use extendable pusher bodies, engaging the inside of the housing of the BHA or the wall of the borehole, to push the drilling bit in its desired position.

The rotary steerable technique can be used with a drilling string, composed out of drilling tubulars, and with a casing string, composed of casing tubulars. In the first case the BHA is connected to the surface with a drilling string, which drilling string is rotated to rotate the BHA. After the borehole has been drilled, the drill string and BHA are retracted form the borehole. The borehole is subsequently provided with casing.

With directional casing drilling, instead of a drilling string a casing string is used for pushing and rotating the BHA. The BHA is secured at, or partially in, the lower end of the casing string. After the drilling, the BHA is disconnected and retracted through the casing string. The casing string remains in the borehole to provide the borehole with a wall.

Even though the rotary steerable technique is more efficient, a drawback is that it requires the use of complicated control systems which allow for adjusting the speed and torque delivery of the drives in the BHA to control the rotational position of the drilling position of the drill bit section. This makes the BHA expensive and prone to failure due to the harsh conditions in the borehole.

The invention aims to provide a directional drilling system that is less complicated, and therefore preferably less prone to malfunction, than known directional drilling systems.

SUMMARY OF THE INVENTION

The invention therefore provides a directional casing drilling system according to claim 1.

A directional casing drilling system to drill a directional borehole in the ground according to the invention comprises:
  a casing string
  a drilling rig adapted to run the casing string in a borehole, including a casing drive engaging an upper end of the casing string for rotating the casing string in the borehole, a control system for controlling the casing drive, and a mud pump for pumping a continuous flow of drilling mud into the casing string during a drilling operation, and,
  a retrievable Bottom Hole Assembly (BHA), the BHA having a torque transfer section and a drill bit section, each having a longitudinal axis extending between a rear end and a front end of the torque transfer section and the drill bit section respectively, wherein the drill bit section supports a drill bit at its front end, and wherein the drill bit section is received in the torque transfer section at the front end thereof such that the front end of the drill bit section is located outside the torque transfer section and the rear end of the drill bit section is located inside the torque transfer section, wherein the torque transfer section of the BHA comprises:

a locking device adapted to secure the torque transfer section, and thus the BHA, in a lower end of the casing string with at least the front end of the drill bit section extending outside the casing string, the torque transfer section being secured relative to the casing string in a translational sense and a rotational sense, a gimbal device, located at the front end of the torque transfer section, which gimbal device supports the drill bit section between the rear end and the front end thereof such that the drill bit section can be gimballed with its longitudinal axis relative to the longitudinal axis of the torque transfer section, and the drill bit section is non-rotational against rotation about its longitudinal axis relative to the torque transfer section, an eccentric part configured to hold the rear end of the drill bit section at a distance from the longitudinal axis of the torque transfer section, thus positioning the drill bit section in a drilling position in which it, and thus the drill bit, extends at an angle to the longitudinal axis of the torque transfer section, which eccentric part is rotatably supported such that it can rotate the rear end of the drill bit section about the longitudinal axis of the torque transfer section, a mud drive, the mud drive comprising a stator that is non-rotational relative to the torque transfer section and a rotor that is non-rotational to the eccentric part, such that the mud flow generated by the mud pump rotates the eccentric part, and thus rotates the drilling position of the drill bit section about the longitudinal axis of the torque transfer section, and a measurement while drilling device comprising a position determining device adapted to register the tool face orientation of the drill bit, the measurement while drilling device further comprising a communicating device for communicating the tool face orientation of the drill bit to the control system of the casing drive to enable the control system of the casing drive to control the tool face orientation of the drill bit section by adjusting the rotational speed of the casing string, more in particular enable the control system of the casing drive to keep the drill bit section at a substantially constant drilling position relative to the borehole to thus drill along a curved drilling trajectory.

The invention thus provides a rotary steerable drilling system based on the "point-the-bit" principle. The gimbal device couples the drill bit section to the torque transfer section, providing a two-degree of freedom universal joint to enable steering functionality and to transmit drilling loads, i.e. torque and axial load, between the torque transfer section and the drill bit section, and to enable rotation of the drilling position of the drill bit section about the longitudinal axis of the torque transfer section.

According to the invention, the mud drive that rotates the eccentric part, and thus rotates the drilling position of the drill bit section about the longitudinal axis of the torque transfer section, is rotated at a constant speed during the drilling process, i.e. is rotated at a constant speed while drilling a linear trajectory, while drilling a curved trajectory, and while changing between drilling curved and a linear trajectory.

To steer the BHA, i.e. to control the drilling position of the drill bit section, the invention provides a casing drive, i.e. a drive for rotating the casing string in which the BHA has been secured, which casing drive has a control system configured to adjust the rotational speed of the casing string relative to the constant rotational speed of the mud drive. The casing drive can be any type of known drive for rotating a casing string during drilling. According to the invention, the control system receives from the BHA the positional information with respect to the drilling position of the drill bit, i.e. the tool face position, and controls the casing drive, more in particular the rotational speed of the casing, to adjusts the drilling position of the drill bit, if desired. The casing string drive and its control system are located outside the borehole.

To determine the position and orientation of the drill bit section, and thus of the drill bit provided at an end of the drill bit section, relative to the earth the BHA is provided with a measurement while drilling device. Measurement while drilling refers to measurements taken downhole in the bottom hole assembly (BHA). The measurement while drilling is used to determine the movement and/or motion of a drill bit and associated drilling equipment in three dimensions during the drilling of the borehole.

More in particular, measurement while drilling determines the Azimuth position and inclination of the drill bit, i.e. its tool face orientation, so that the coordinates of the drill bit, for example relative to the top of the borehole, can be computed. Thus, according to the invention, the measurement while drilling device of the BHA provides the control system of the casing drive with the information need to determine, control and direct the position of the drill bit, and thus enable the control system to steer the BHA while drilling the borehole.

It is observed that within the technical field of directional borehole drilling measurement while drilling systems are generally known. The measurement while drilling is considered to be part of the knowledge of the skilled person in this particular technical field, and is therefore not discussed in further detail. However, it is submitted that with known measurement while drilling devices typically do not communicate the tool face position at intervals which are sufficiently short to enable accurate control of the position of the drill bit section using a casing drive according to the invention. Preferably, the measurement while drilling of a BHA according to the invention communicates the rotational speed of the drilling position of the drill bit section, and preferably communicates the tool face position and/or the rotational speed of the drilling position at least multiple times a minute.

The invention thus provides a directional borehole casing drilling system that utilises a simplified BHA, more in particular a BHA that uses a mud drive for rotating the drilling position of the drill bit section in a direction contrary to the direction of rotation of the casing string. The rotational speed of the mud drive is determined by the mud flow pumped through the casing string. Therefore, the mud drive does not need a control system to regulate the rotational speed of the mud drive to enable control of the drilling position of the drill bit section. More in particular, the mud drive does not need a control system comprising control valves etc, for downhole control of the rotational speed of the mud drive. According to the invention, a simple mud drive can be used, the rotational speed of which depends on the mud flow pumped through the borehole only. Furthermore, the rotational speed of the mud drive can be kept constant during the drilling process, and does not need to be adjusted to steer the BHA.

According to the claimed invention, the mud drive rotates the drilling position of the drill bit section in a first rotational direction relative to the longitudinal axis of the torque transfer section of the BHA, for example in a clockwise direction when seen in the drilling direction. The casing drive rotates the casing string in a rotational direction opposite the rotational direction into which the drilling position is rotated. Since in this example the drilling position of the drill bit section is rotated in a clockwise direction when seen in the drilling direction, the casing string is rotated in a counter clockwise direction.

When the casing drive drives the casing string at the same rotational speed as the mud drive rotates the drilling position of the drill bit section, both rotational movements cancel each other out and the drill bit section is held at a constant drilling position relative to the borehole. Thus, the BHA drills a borehole along a curved trajectory.

When the casing drive drives the casing string at a rotational speed that differs from the rotational speed the mud drive rotates the drilling position of the drill bit section, both rotational movements will not cancel each other out and the drill bit section is not held at a constant drilling position relative to the borehole. When, in this example, the casing string is rotated at a slower speed, the drilling position of the drill bit section will rotate clockwise.

When the casing string is rotated at a faster rotational speed, the drilling position of the drill bit section will rotate counter clockwise. Thus, in both cases, the drill bit section is not held at a constant drilling position relative to the borehole, and the BHA will drill a borehole along a linear trajectory.

Thus, according to the claimed invention, the BHA is steered by adjusting the rotational speed of the casing string, which enables the BHA to be steered from outside the borehole. There is no need for sending information down the borehole to the BHA to adjust the rotational speed of the mud drive, for example by adjusting valves and/or electric drives, to steer the BHA.

It is noted that the difference in rotational speeds should be above a certain threshold to have the desired effect. For example, when the mud drive rotates the drilling position of the drill bit section at about 100 revolutions per minute, the casing string can be rotated at about 100 revolutions per minute to drill a curved borehole section and at less than 95 revolutions per minute, for example 90 revolutions per minute, or more than 105 revolutions per minute, for example 110 revolutions per minute, to drill a straight borehole section.

Prior art directional drilling systems utilize a mud drive located in the BHA for positioning the drill bit section. These mud drives are configured such that their rotational speed can be adjusted, while the mud flow through the casing string is kept constant, to thus control, more in particular adjust, the rotational speed of the drilling position of the drill bit section relative to the torque transfer section. These prior art BHA are provided with mud drives that have throttling devices, valves, etc. to control and adjust the volume of mud flow that flows through the mud drive to adjust the rotational speed of the mud drive during the drilling process. These types of mud drives are complicated, and therefore prone to mall function in particular in the harsh environment in a borehole, and expensive.

In alternative prior art embodiments, mud drives for rotating the drill bit section are provided with adjustable torque converters to thus control, more in particular adjust, the amount of torque that is delivered by the mud drive to the drill bit section during the drilling process. In alternative prior art embodiments, mud drives are used to power controlled electro motors which in turn are used to rotate the drilling position of the drill bit section. These types of drives are complicated as well, and therefore are prone to malfunction in particular in the harsh environment in a borehole, and expensive also.

It is observed that the drill bit section of the BHA is non-rotational relative to the torque transfer section. Thus, the drill bit section can not rotate about its longitudinal axis relative to the torque transfer section. Because the drill bit section is gimballed relative to the torque transfer section, it can be supported in a drill position in which the longitudinal axis of the drill bit section extends at an angle relative to the longitudinal axis of the torque transfer sections. Furthermore, because the drill bit section is gimballed, this drill bit position can be rotated about the longitudinal axis of the torque transfer section. By pivoting the rear end of the torque transfer section along a circular trajectory about the longitudinal axis of the torque transfer section, the front end of the drill bit section is moved in a circular trajectory about the longitudinal axis of the torque transfer section also. In this document this is referred to as the drill position of the drill bit section being rotated about the longitudinal axis of the torque transfer section.

It is observed that in when the drill bit section is in its drilling position the angle between the longitudinal axis of the torque transfer section and the longitudinal axis of the drill bit section will typically be in the range of 1-5 degrees for example will be 2 or 3 degrees. It is furthermore observed that when the angle is large, i.e. more than 2 degrees, the BHA is preferably provided with an angle adjustment system that allows the drill bit section to be pivoted between a drilling position, in which the drill bit section is supported with its longitudinal axis at an angle relative to the longitudinal axis of the torque transfer section, and an inactive position, in which the angle is smaller, preferably is substantially 0 degrees such that the longitudinal axis of the drill bit section coincides with the longitudinal axis of the torque transfer section, such that the drill bit does not block the BHA from being pulled into and moved through the casing string for removing the BHA from the casing string.

As was set out above, the drilling position of the drill bit section relative to the torque transfer section is controlled by the control system of the casing drive adjusting the rotational speed of the casing string while the mud drive rotates the drill bit section at a constant speed.

The control system is configured to receive information regarding the tool face orientation of the drill bit section, and to control, more in particular adjust the tool face orientation of the drill bit section, by adjusting the rotational speed of the casing string while the rotational speed of the mud drive is kept constant. In this document, the tool face orientation relates to the Azimuth position, inclination and location of the drill bill bit section, and thus of the drill bit. Determining the tool face orientation of the drill bit section or drill bit provides the information required to determine the position of the drill bit relative to the top of the bore hole, i.e. the Azimuth position, inclination and location of the drill bill bit section, and thus of the drill bit, relative to the earth.

By rotating the casing string in a direction contrary to the direction of rotation of the mud drive and at the same rotational speed as the mud drive, the drilling position of the drill bit section is kept constant relative to the borehole, or, in other words, the drilling bit is kept geo stationary or at a constant tool face orientation. Thus, the borehole is drilled along a curved trajectory in line with, or tangent to, the longitudinal axis of the drill bit section of the BHA.

By increasing or decreasing the rotational speed of the casing string, and thus rotating the casing string in a direction contrary to the direction of rotation of the mud drive but at a rotational speed that differs from the rotational speed of the mud drive, the drilling position of the drill bit section relative to the borehole, i.e. its tool face orientation, is changed. Due to the difference in rotational speed the drilling position of the drill bit section is rotated about the longitudinal axis of the torque transfer section. Thus, the drill bit is moved along a circular trajectory, the centre of which coincides with the longitudinal axis of the torque transfer section, while drilling the borehole. The borehole is thus drilled along a linear trajectory in line with the longitudinal axis of the torque transfer section of the BHA.

It is noted that the directional casing drilling system according to the invention utilizes casing for driving the drill bit since a typical drilling string would be too flexible to provide a reliable drilling process. By using the casing string, having a larger cross section and being rotationally stiff, a more direct and reliable control of the position of the drill bit section is possible.

It is furthermore noted that even when using a casing string to drive, i.e. rotate, the BHA, the casing string may twist during the drilling process, more in particular wind and unwind, such that even though the casing drive rotates the top end of the casing string at a constant speed, small variations in the rotational speed of the bottom end of the casing string, and thus in the rotational speed of the BHA and the drill bit section, may occur. These variations may be small such that they do not influence the drilling process, or can be compensated by adjusting the rotational speed with which the casing drive rotates the casing string. The control system thus actively controls the position of the drill bit section to compensate for these kinds of fluctuations if necessary, and to thus keep the drilling position of the drill bit section at a substantially constant position relative to the borehole, or rotate the drilling position of the drill bit section at a substantially constant speed relative to the borehole.

As was already explained above, the BHA comprises a measurement while drilling device comprising a position determining device adapted to register the tool face orientation of the drill bit. The measurement while drilling device further comprises a communicating device for communicating the tool face orientation of the drill bit to the control system of the casing drive, to thus enable the control system to control the tool face orientation of the drill bit section by adjusting the rotational speed of the casing string.

In an embodiment according to the invention, the measurement while drilling device is provided in an instrument section that is rotatably fixed relative to rotor of the mud drive. Thus, the measurement while drilling device is rotatably fixed relative to the eccentric part, and thus relative to the drilling position of the drill bit section. Therefore, when the drill bit section is held in a geostationary drilling position, i.e. when the BHA is drilling a curved trajectory, the measurement while drilling device is also held in a geostationary position, which enables the device to provide more accurate information regarding the position of the drill bit section. This is beneficial since drilling along a curved trajectory requires the bit to be held at a particular drilling position, while when drilling along a straight trajectory the position of the drill bit section continually changes, and is overall less critical.

In a further embodiment, the rotor of the mud drive is at one end connected to the eccentric part, and is at its opposite end connected to the measurement while drilling device. Thus, the measurement while drilling device is not only rotationally fixed relative to the drilling position of the drill bit section, it is also provided upstream, i.e. with respect to the mudflow being pumped through the casing string and the BHA towards the drill bit. Thus, the mud drive, and the turbulence in the mud flow generated by the mud drive, do not interfere with the information send to the top of the casing string, i.e. towards the control system of the casing drive. This is especially beneficial when the measurement while drilling utilizes mud pulse telemetry to send information to the control system. In an alternative embodiment, the measurement while drilling is for example provided between, and rotationally fixed relative to, the rotor and the eccentric part.

In an embodiment, the BHA comprises a flexible hinge section, for example by providing a flexible shaft or a flexible hinge section such as a cardan joint, located between the rotor of the mud drive and the torque transfer section and/or between the rotor of the mud drive and the eccentric part to flexibly and rotatably support the rotor of the mud drive in the stator of the mud drive. Such a flexible and rotatable support of the rotor is known from the prior art, and is used to allow for the rotor to freely move inside the stator up to a certain extend. In such an embodiment, the measurement while drilling device is preferably provided in between the rotor and the flexible hinge section.

In an alternative embodiment, the BHA is of a simplified design, and the eccentric part is coupled directly with the rotor of the mud drive. Thus there is no flexible hinge section in the form of for example a cardan joint provided between the eccentric part and the rotor. In such an embodiment, the movement of the rotor is directly linked to the movement of the eccentric part.

The eccentric part can for example be rigidly fixed to the rotor, or can be integrated with the rotor. In an embodiment, the eccentric part is rotationally supported by for example bearings. In an alternative embodiment, the eccentric part is supported by the rotor, which in turn may be rotationally supported in the stator.

The eccentric part may still be configured for moving the rear end of the bit section between a position on the longitudinal axis and a position at a distance from the longitudinal axis of the torque transfer section, to thus pivot the drill bit section between an inactive position and a drilling position. In an alternative embodiment, the eccentric part holds the rear end at a fixed distance to the longitudinal axis of the torque transfer section, and the drill bit section will continuously be held in a drilling position.

By connecting the eccentric part directly to the rotor instead of providing a flexible connection between the two, the design of the BHA becomes less complicated, which reduces manufacturing costs and also reduces the chances of the BHA breaking down during operation.

It is noted that the rotor of a mud drive typically does not stay exactly centered in the stator while rotating. The rotor wanders around within the stator, often along a more or less predictable trajectory depending on the configuration of the rotor, stator and mud flow.

In such an embodiment, the deviations in the position of the rotor are translated, via stator and drill bit section, to deviations of the position of the drill bit. However, it has been found that when the mud drive is used in a BHA to directly drive the eccentric part, these deviations in the position of the drill bit more or less even out while drilling, at least to such an extent that the BHA can still be steered along a straight or curved trajectory by controlling the rotational speed of the casing string.

In a further alternative embodiment, the eccentric part is fixed to the rotor directly and the pivot point of the drill bit section at which it is supported by the eccentric part is located in line with the center axis of the rotor. In such an embodiment, not the rotation of the rotor about its own axis is used for rotating the drilling position of the drill bit about the longitudinal axis of the torque transfer section, but the rotation of the rotor about the central axis of the stator. Such an embodiment can be used with mud drives of which the rotor is sufficiently off center with respect to the stator, and thus with respect to the longitudinal axis of the torque transfer section, to provide the drilling bit section with the required angle relative to the longitudinal axis of the torque transfer section. For example a mud drive having a rotor with an off center position, i.e. having a central axis is spaced relative to the central axis of the stator, of at least 5 mm during use.

It is noted that the eccentric part preferably is hingeably and/or pivotably connected, for example using a ball joint or cardan joint, with the rear end of the drill bit section, to facilitate the rotational support of the rear end of the drill bit section. In particular when the eccentric part supports the rear end of the drill bit section at the central axis of the rotor, a connection which allows for rotation of the drill bit section relative to the eccentric part is desired. Also, when the drill bit section can be pivoted between its drilling position and a non-active position, i.e. in line with the longitudinal axis of the torque transfer section, a hingeable connection is desired. When the drill bit section is supported in a drilling position only, the rear end of the drill bit section may also be fixed in the eccentric part.

It is noted that also flexible connections may be used to achieve the desired relative freedom of movement between eccentric part and the drill bit section.

In an embodiment of a BHA according to the invention, the measurement while drilling device, or at least the position determining device thereof, is housed in a tubular shaped housing provided with radially extending spacers along its outside to keep the tubular housing at the centre of the torque transfer section to thus create a channel between the tubular housing and the torque transfer section for the mud flow to flow through.

In a further embodiment of a BHA according to the invention, the housing of the measurement while drilling device is made of a material with a relative magnetic permeability of approximately 1, such as a non ferromagnetic substance, in particular a composite material or aluminium. With a BHA according to the invention the torque for rotating the drill bit section is transferred from the casing string via the torque transfer section and the gimbal device to the drill bit section. When the housing of the measurement while drilling device is provided between the mud drive and the gimbal device, it is not subjected to the drilling torque. Therefore, the housing needs to be less strong which allows for making the housing from a non ferro material, for example a composite material, or form aluminium, which increases the visibility of the earth magnetic field for the instruments held inside the housing.

Preferably, the housing of the measurement while drilling device is made of a non ferromagnetic substance, in particular a composite material or aluminium. In an embodiment, the casing string is a string of steel tubulars, the casing string having a bottom end that comprises a steel section for the BHA to lock into, and an aluminium, beryllium, copper or a composite tubular end section located below, i.e. downstream, the steel section the BHA has been locked into, that provides a see through window in the casing string for the measurement while drilling device in the BHA. The see through window in the casing is useful for providing the position determining device with a better view of the earth magnetic field, the casing still providing a wall or liner of the borehole. The see through window is located in the casing string such that it lines up with the measurement while drilling device of the BHA locked in the casing string.

In an embodiment of a BHA according to the invention, the communicating device for communicating the tool face orientation of the drill bit to the control system of the casing drive is configured to send the information using mud pulse telemetry. In an alternative embodiment the tubulars of the casing string are provided with wires configured for sending information from the BHA to the control system, or EM telemetry is used to send directional data back to the surface.

In an embodiment of a BHA according to the invention, the torque transfer section is provided with one or more inner conduits for channelling the entire mud flow that is pumped into the casing string through mud drive. Thus, the entire mud flow that is pumped into the casing string flows through the BHA, and through the mud drive. Thus the full mud flow can be utilized for driving the mud drive. It is noted that on the return flow, when the mud flow flows back to the surface, the mud flow in casing drilling systems typically flows along the outside of the drill string, thus transporting drilling debris to the surface and out of the borehole.

In a further embodiment, the eccentric part is provided with one or more inner conduits for channelling the entire mud flow that is channelled through the torque transfer section to the drill bit section. Thus the mud flow can be guided into conduits or channels provided in the drill bit section and the mud flow can be prevented from flowing along the outside of the drill bit section and the gimbal device.

In a further embodiment, the drill bit section is provided with one or more inner conduits, extending from the rear end to the front end of the drill bit section, for channelling the entire mud flow that is pumped into the casing string through drill bit section. Thus the mud flow can be guided into conduits or channels provided in the drill bit section and the mud flow can be prevented from flowing along the outside of the drill bit section and the gimbal device.

According to the invention, the drill bit section is omnidirectionally pivotally supported intermediate its front and rear end by a gimbal device, thus providing a universal joint located within the torque transfer section.

Suitable torque transmitting arrangements for providing a gimbal device include many well-known devices such as splined couplings, gearing arrangements, and cardan joints or universal joints such as steering u-joints.

In an embodiment according to the invention, the gimbal device comprises a ball joint, comprising a ball shaped part mounted on the drill bit section such that the longitudinal axis of the drill bit section coincides with the centre of the ball part, a socket part mounted in, and fixed relative to, the torque transfer section, in which socket part the ball part is pivotably received, and wherein the ball part and the socket part are provided with intermeshing members, e.g. teeth, which intermeshing members extend in substantially the longitudinal direction of the torque transfer section and the drill bit section respectively. The ball joint configuration allows for the drill bit section to be gimballed with its longitudinal axis relative to the longitudinal axis of the torque transfer section. The intermeshing members provided on the ball part and the socket part rotationally secure the drill bit section relative to the torque transfer section such that the drill bit section can not rotate in the socket part about its longitudinal axis. The intermeshing members therefore enable a torque, e.g. a torque generated by rotating the casing string, to be transferred between torque transfer section and the drill bit section.

In an alternative embodiment, the gimbal device comprises a flexible body, for example a rubber body, which flexible body is mounted on the drill bit section such that the longitudinal axis of the drill bit section coincides with the centre of the flexible body, and which flexible body is fixed to the torque transfer section. The flexibility of the body allows for the drill bit section to be gimballed with its longitudinal axis relative to the longitudinal axis of the torque transfer section. The torsional strength of the flexible body rotationally secures the drill bit section relative to the torque transfer section such that the drill bit section can not rotate in the holder part about its longitudinal axis. Thus, a torque can be transferred between torque transfer section and the drill bit section via the flexible body. In a further embodiment, the flexible body also acts as a seal for preventing drill mud to flow along the outside of the drill bit section. In such an embodiment, the drill bit section is provided with one or more internal conduits for channelling the mud flow through the drill bit section towards the drilling bit.

In an alternative embodiment, the gimbal device is a universal joint that uses a multitude of peg bodies, which peg bodies are provided in sockets located along the outer circumferential surface of a cylindrical ball joint and along the inner circumferential body of a corresponding socket. The peg bodies are cylindrically shaped. The sockets are configured to loosely receive one half of the peg bodies. Both peg bodies and sockets extend in the longitudinal direction of the drill bit section. Thus, the peg bodies lock the drill bit section against movement in the longitudinal direction of the drill bit section, prevent rotation of the drill bit section about its longitudinal axis relative to the torque transfer section, and transfer a torque between the torque transfer section, i.e. the socket, and the drill bit section, i.e. the cylindrical central part of the ball joint.

In an embodiment, the cylindrical bodies are made from a plastic material, the material providing the cylindrical bodies with some resilience, and thus for a more smooth support of the pivoting action of the drill bit section.

In an alternative embodiment, the gimbal device is a universal joint that uses a multitude of balls in pockets around the circumference of the drill bit section, which balls are received in corresponding cylindrical channels. Thus, the torque is transmitted from the torque transfer section to the drill bit section and the drill bit via the balls and the slots.

According to the invention, the drill bit section is non-rotational relative to the torque transfer section. Therefore the drill bit section can be gimballed, and the gimbal does not need to allow for rotation of the drill bit section about its longitudinal axis. The gimbal device can therefore be kept simple and robust, which allows for an increased durability and reduced chance of failure.

Alternative gimbal devices known from the prior art and suitable for supporting the drill bit section in the torque transfer section may also be used.

In an embodiment according to the invention, the directional casing system is configured to rotate the mud drive at a substantially constant speed of about 100 rotations per minute during the drilling process. It is observed that at a rotational speed in the range of 80 to 120 revolutions per minute, in particular at a speed in the range of 90 to 110 revolutions per minute, mud drives typically show a linear relationship between the volume of mud flow, the rotational speed of the mud drive and the torque delivered by the mud drive. Thus, utilizing the mud drive of the BHA in this range during the drilling process, allows for a reliable and predictable behaviour of the mud drive and thus of a reliable and predictable drilling process.

In an embodiment, of a drilling system according to the invention, the eccentric part of the BHA is furthermore mounted to an angle adjustment system to selectively bring the rear end of the drill bit section on the longitudinal axis of the torque transfer section, thus positioning the drill bit section in an inactive position, in which inactive position the longitudinal axis of the drill bit section is in line with the longitudinal axis of the torque transfer section, and to bring the rear end of the drill bit section in an active position, in which active position the rear end of the drill bit section is offset from the longitudinal axis so that the angle adjustment system is configured to pivot the drill bit section between the inactive position and the drilling position, which angle adjustment system comprises:

- a piston;
- a pressure chamber, which pressure chamber moveably holds the piston, such that the piston can move along the longitudinal axis of the torque transfer section between a first position and a second position in the pressure chamber;
- a biasing device, which biasing device forces the piston into its first position; and
- a mechanical linkage device that connects the piston via the eccentric part with the rear end of the drill bit section such that when the piston is moved from its first into its second position, the drill bit section is pivoted from its inactive position into its drilling position and vice versa, wherein the chamber is provided with an opening for receiving drilling mud pumped into the casing string by the mud pump, wherein the biasing device is configured such that during drilling operations the pressure of the mud in the pressure chamber forces the piston from its first position into its second position.

Thus, the drill bit section can be pivoted into a drilling position, for drilling a borehole, by increasing the pressure of the drilling mud in the casing string up to the working pressure, i.e. the pressure during the drilling process, and the drill bit section can be pivoted into an inactive position, to enable the BHA to be retracted through the casing string, by reducing the pressure of the drilling mud from the working pressure.

By enabling the drill bit section to be pivoted into an inactive position, the drill bit section, when in its drilling position, can extend at a larger angle relative to the longitudinal axis of the torque transfer section. Such a larger angle allows for drilling sharper curvatures.

When the drill bit section can not be pivoted into an inactive position, the angle the drilling bit makes with the longitudinal axis of the torque transfer section should be limited to allow the BHA to be retracted through the casing string.

In a further embodiment, the piston comprises one or more inner conduits for channelling drilling mud, preferably from the chamber, to the eccentric part, preferably to one or more channels in the eccentric part. Thus, the drilling mud is guided through the internals of the BHA and the components are shielded from the drilling mud.

In a further embodiment according to the invention, the mechanical linkage device comprises
a head part connected with the piston, which head part comprises a cam track, the cam track extending at an angle with the longitudinal axis of the torque transfer section between a first end located radially inward and a second end located radially outward, and a cam in the form of a ball shaped head provided at the rear end of the drill bit section, which cam is received in the cam track such that when the piston moves between the first and second position the cam is moved along the cam track. Thus, the position of the drill bit section can be adjusted using a mechanical system, and there is no need for a complicated system such as an electronic system with actuators, sensors, etc.

In an alternative embodiment, the mechanical linkage device comprises a rod which rod is at one end hingeably connected to the piston and with its opposite end is hingeably connected to the rear end of the drill bit section to form a linkage mechanism with the piston and the drill bit section, which linkage system is configured such that when the piston is in its first position the longitudinal axis of the rod is in line with the longitudinal axis of the torque transfer section and with the longitudinal axis of the drill bit section, and when the piston is in its second position the rod extends at an angle to the longitudinal axis of the torque transfer section and with the longitudinal axis of the drill bit section, such that the drill bit section is positioned in its drilling position. Thus, the position of the drill bit section can be adjusted using a mechanical system, and there is no need for a complicated system such as an electronic system with actuators, sensors, etc.

In a preferred embodiment, the invention provides a directional casing drilling system to drill a directional borehole, the drilling system comprising:
- a casing string
- a drilling rig adapted to run the casing string in a borehole, including a casing drive engaging an upper end of the casing string for rotating the casing string in the borehole, a control system for controlling the casing drive, and a mud pump for pumping a continuous flow of drilling mud into the casing string in the borehole during drilling operations, and,
- a retrievable Bottom Hole Assembly (BHA), the BHA having a torque transfer section and a drill bit section, each having a longitudinal axis extending between a rear end and a front end of the torque transfer section and the drill bit section respectively, wherein the drill bit section supports a drill bit at its front end, and wherein the drill bit section is received in the torque transfer section at the front end thereof such that the front end of the drill bit section is located outside of the torque transfer section and the rear end of the drill bit section is located inside the torque transfer section, wherein the torque transfer section of the BHA comprises:
- a locking system adapted to secure the torque transfer section, and thus the BHA, in a lower end of the casing string with at least the front end of the drill bit section extending outside the casing string, the torque transfer section being secured relative to the casing string in a translational sense and a rotational sense,
- a gimbal device, located at the front end of the torque transfer section, which gimbal device supports the drill bit section between the rear end and the front end thereof such that the drill bit section can be gimballed with its longitudinal axis relative to the longitudinal axis of the torque transfer section, and the drill bit section is non-rotational against rotation about its longitudinal axis relative to the torque transfer section,
- an eccentric part mounted to an angle adjustment system to selectively bring the rear end of the drill bit section at a distance from the longitudinal axis of the torque transfer section, thus positioning the drill bit section in a drilling position in which it, and thus the drill bit, extends at an angle to the longitudinal axis of the torque transfer section, which eccentric part is rotatably supported such that it can rotate the rear end of the drill bit section about the longitudinal axis of the torque transfer section, wherein the eccentric part of the BHA is furthermore mounted to an angle adjustment system adapted to selectively bring the rear end of the drill bit section on the longitudinal axis of the torque transfer section, thus positioning the drill bit section in an inactive position in which the longitudinal axis of the drill bit section is in line with the longitudinal axis of the torque transfer section, and to bring the rear end of the drill bit section in an active position offset from the longitudinal axis so that the angle adjustment system is configured to pivot the drill bit section between an inactive position and the drilling position, which angle adjustment system comprises:
- a piston:
- a pressure chamber, which pressure chamber moveably holds the piston, such that the piston can move along the longitudinal axis of the torque transfer section between a first position and a second position in the pressure chamber;
- a biasing device, which biasing device forces the piston into its first position; and
- a mechanical linkage device that connects the piston via the eccentric part with the rear end of the drill bit section such that when the piston is moved from its first into its second position, the drill bit section is pivoted from its inactive position into its drilling position and vice versa, wherein the chamber is provided with an opening for receiving drilling mud pumped into the casing string by the mud pump, wherein the biasing device is configured such that during drilling operations the pressure of the mud in the pressure chamber forces the piston from its first position into its second position,
- a mud drive, the mud drive comprising a stator that is non-rotational relative to the torque transfer section and a rotor that is non-rotational to the eccentric part, such that the mud flow generated by the mud pump rotates the eccentric part, and thus rotates the drilling position of the drill bit section about the longitudinal axis of the torque transfer section, and
- a measurement while drilling device comprising a position determining device adapted to register the tool face orientation of the drill bit, the measurement while drilling device further comprising a communicating device for communicating the tool face orientation of the drill bit to the control system of the casing drive to enable the control system to control the tool face orientation of the drill bit section by adjusting the rotational speed of the casing string.

Thus, the invention provides a directional casing drilling system comprising a simple and robust Bottom Hole Assembly comprising both a mud drive and angle adjustment system which do not require complicated control systems in the BHA for controlling and adjusting the position of the drill bit section. Both are activated by the working pressure of the drilling mud, i.e. the pressure in the drilling mud during the drilling process.

Therefore, the drill bit section can be controlled from above ground by providing a flow of drilling mud and controlling the rotational speed of the casing string, which obsoletes complicated electronic control systems for adjusting valves and/or controlling electric drives, etc. to manipulate the drill bit section.

Thus, the invention provides a simplified and robust directional casing drilling system that with a reduced chance of brake down and reduced maintenance costs.

The invention furthermore provides a Bottom Hole Assembly (BHA) for use in a directional casing drilling system, preferably a directional casing drilling system according to the invention, to drill a directional borehole in the ground, the BHA comprising an angle adjustment system as described above.

This BHA has a torque transfer section and a drill bit section, each having a longitudinal axis extending between a rear end and a front end of the torque transfer section and the drill bit section respectively, wherein the drill bit section supports a drill bit at its front end, and wherein the drill bit section is received in the torque transfer section at the front end thereof such that the front end of the drill bit section is located outside of the torque transfer section and the rear end of the drill bit section is located inside the torque transfer section, wherein the torque transfer section of the BHA comprises:
- a locking system adapted to secure the torque transfer section, and thus the BHA, in a lower end of a casing string with at least the front end of the drill bit section extending outside the casing string, and with the torque transfer section being secured relative to the casing string in a translational sense and a rotational sense,
- a gimbal device, located at the front end of the torque transfer section, which gimbal device supports the drill bit section between the rear end and the front end thereof such that the drill bit section can be gimballed with its longitudinal axis relative to the longitudinal axis of the torque transfer section, and the drill bit section is non-rotational against rotation about its longitudinal axis relative to the torque transfer section,
- an eccentric part mounted to an angle adjustment system to selectively bring the rear end of the drill bit section at a distance from the longitudinal axis of the torque transfer section, thus positioning the drill bit section in a drilling position in which it, and thus the drill bit, extends at an angle to the longitudinal axis of the torque transfer section, which eccentric part is rotatably supported such that it can rotate the rear end of the drill bit section about the longitudinal axis of the torque transfer section, wherein the eccentric part of the BHA is furthermore mounted to an angle adjustment system adapted to selectively bring the rear end of the drill bit section on the longitudinal axis of the torque transfer section, thus positioning the drill bit section in an inactive position in which the longitudinal axis of the drill bit section is in line with the longitudinal axis of the torque transfer section, and to bring the rear end of the drill bit section in an active position offset from the longitudinal axis so that the angle adjustment system is configured to pivot the drill bit section between an inactive position and the drilling position, which angle adjustment system comprises:

- a piston:
- a pressure chamber, which pressure chamber moveably holds the piston, such that the piston can move along the longitudinal axis of the torque transfer section between a first position and a second position in the pressure chamber;
- a biasing device, which biasing device forces the piston into its first position; and
- a mechanical linkage device that connects the piston via the eccentric part with the rear end of the drill bit section such that when the piston is moved from its first into its second position, the drill bit section is pivoted from its inactive position into its drilling position and vice versa, wherein the chamber is provided with an opening for receiving drilling mud pumped through the BHA during a drilling operation, wherein the biasing device is configured such that during a drilling operation the pressure of the mud in the pressure chamber forces the piston from its first position into its second position,
- a drive, for rotating the angular adjustment system relative to the casing, and thus rotate the drilling position of the drill bit section about the longitudinal axis of the torque transfer section while the drill bit section is in its drilling position, and
- a measurement while drilling device comprising a position determining device adapted to register the tool face orientation of the drill bit.

Such a bottom hole assembly allows for control of the position of the drill bit section, more in particular for the movement of the drill bit section between its drilling position and its inactive position, by adjusting the pressure in the borehole, more in particular the pressure of the flow of drilling mud pumped through a casing string and the Bottom Hole Assembly during the drilling process.

By increasing the pressure of the drilling mud up to the working pressure, i.e. the pressure during the drilling process, the drill bit section of the BHA is moved from its inactive position into its drilling position. Therefore, the drill bit section can be controlled from above ground by providing a flow of drilling mud, which obsoletes an electronic control system for adjusting valves and/or controlling electric drives, etc. to manipulate the drill bit section. Thus, the invention provides a simple and robust BHA that can be used for directional drilling with a reduced chance of brake down and reduced maintenance costs.

The invention furthermore provides a Bottom Hole Assembly (BHA) for use in a directional casing drilling system, preferably a directional casing drilling system according to the invention, to drill a directional borehole in the ground. According to the invention, the BHA comprises a simplified design, which allows for reduced production costs and an increased reliability.

In an embodiment, the BHA according to the invention is a point the bit type BHA and has an eccentric part that is coupled directly with the rotor, i.e. without a flexible or hinge connection between the two, such that the movement of the rotor is directly linked to the movement of the eccentric part. In a further embodiment, the eccentric part of the BHA is configured to support the rear end of the drill bit section in line with the central axis of the rotor of the mud drive. In addition, or as an alternative, the eccentric part is configured for pivoting the drill bit section between an inactive position and a drilling position, for example by way of an angle adjustment system described above.

The invention furthermore provides a Bottom Hole Assembly (BHA) for use in a directional casing drilling system, preferably a directional casing drilling system according to the invention, to drill a directional borehole in the ground, wherein the BHA has:
a torque transfer section; and
a drill bit section;
wherein the torque transfer section and the drill bit section each have a longitudinal axis extending between a rear end and a front end of the torque transfer section and the drill bit section respectively,
wherein the drill bit section supports a drill bit at its front end, and wherein the drill bit section is received in the torque transfer section at the front end thereof such that the front end of the drill bit section is located outside the torque transfer section and the rear end of the drill bit section is located inside the torque transfer section, and
wherein the torque transfer section of the BHA comprises:
  a locking system adapted to secure the torque transfer section, and thus the BHA, in a lower end of the casing string with at least the front end of the drill bit section extending outside the casing string, the torque transfer section being secured relative to the casing string in a translational sense and in a rotational sense;
  a gimbal device, located at the front end of the torque transfer section, which gimbal device supports the drill bit section between the rear end and the front end thereof such that the drill bit section can be gimballed with its longitudinal axis relative to the longitudinal axis of the torque transfer section, and the drill bit section is non-rotational against rotation about its longitudinal axis relative to the torque transfer section, and
wherein the gimbal device is a universal joint comprising:
  a ball joint and a corresponding socket part; and
  a multitude of peg bodies, each peg body being provided in a socket located along the outer circumferential surface of a cylindrical ball joint and in a socket located along the inner circumferential body of the corresponding socket part; and
wherein the peg bodies and sockets extend in the longitudinal direction of the drill bit section and the torque transfer section, when the longitudinal axis of the drill bit section coincides with the longitudinal axis of the torque transfer section, and
wherein one of the sockets, preferably the socket in the in the outer circumferential surface of the ball joint, substantially encloses the peg body, such that the peg body is more or less locked in position; and
wherein the other socket, preferably in the inner circumferential surface of the socket, has a length substantially larger than the length of the peg body, such that the peg body can move along the axial direction of that socket, and the peg bodies thus prevent rotation of the drill bit section about its longitudinal axis relative to the torque transfer section, and enable to transfer a torque between the cylindrical ball joint and the socket of the gimbal device.

The peg bodies and sockets extend in the longitudinal direction of the drill bit section and the torque transfer section, when the longitudinal axis of the drill bit section coincides with the longitudinal axis of the torque transfer section.

Preferably, the peg bodies are barrel shaped and the outer sockets have a length substantially larger than the length of the peg bodies and preferably have a curved contact surface, or surfaces, for guiding the peg bodies along a curved trajectory, the trajectory extending in a plane comprising the longitudinal axis of the torque transfer section, to thus facilitate pivoting of the drill bit section relative to the longitudinal axis of the torque transfer section.

Preferably, the inner sockets, provided in the outside surface of the ball part of the universal joint, have a length substantially similar to the length of the peg bodies, and are shaped such that the peg bodies are more or less fixed in their position relative to the ball part of the universal joint. The outer sockets, provided in the inside surface of the socket part of the universal joint, preferably have a length substantially larger than the length of the individual peg bodies, such that the peg bodies can slide in the longitudinal direction through said outer sockets, to thus enable pivoting of the drill bit section.

The preferably barrel shaped peg bodies prevent rotation of the drill bit section about its longitudinal axis relative to the torque transfer section, and enable to transfer a torque between the cylindrical ball joint and the socket of the gimbal device.

The BHA is provided with an interface between the torque transfer section and the drill bit section comprising facing surfaces for the transfer of axial forces between the torque transfer section and the drill bit section and/or for guiding the drill bit section while being pivoted relative to the torque transfer section. These kind of guide surfaces, forming an interface between the hingeable connected components, are a typical part of a ball joint. The guide surfaces can be part of a seal and/or can be provided in the form of replaceable inserts that can be removed from the joint when worn.

In an embodiment, the outer sockets have a contact surface, i.e. the surface along which the peg bodies slide, that extends along a curved trajectory, said curved trajectory extending in a plane comprising the longitudinal axis of the torque transfer section.

In an embodiment, the sockets on the ball part and/or on the socket part have an essentially V-shaped cross section, such that the preferably barrel shaped peg bodies are supported by each side wall. The peg body thus has two contact surfaces, one for each side wall, per socket.

In a further embodiment, these side walls of the sockets, i.e. the walls extending in the longitudinal direction of the torque transfer section, are concave, having a radius of curvature, when seen in cross sectional plane extending perpendicular to the longitudinal axis of the socket, that is larger than the radius of curvature of a cross section of the peg bodies.

Thus, in such an embodiment, the sockets, when seen in a cross sectional plane extending perpendicular to the longitudinal axis of the socket, each comprises two curved side walls, the side walls having the same radius of curvature. Preferably, the radius of curvature of the socket side walls is at least 10% larger than the radius of curvature of the outer surface of the peg bodies, when seen in cross section.

The V shaped cross sections allow for a certain extent of deformation of the peg bodies during use, while preventing the peg bodies from sliding along the edges that define the opening of the sockets and thus reduce wear of those peg bodies.

In an embodiment of a BHA according to the invention the peg bodies are made of a plastic material while the parts of the gimbal device defining the sockets are made of a steel, for example a chrome steel, such that the peg bodies are flexible compared to the pockets in which they are received. In a further embodiment, the peg bodies are made of a material comprising at least 85% PEEK, for example 90% PEEK, and preferably at least 4% Teflon, the peg bodies for example comprising 90% PEEK and 10% Teflon.

In an embodiment of the universal joint of the BHA the outer circumferential surface of the ball joint comprising the sockets in which the peg shaped bodies are received is cylindrical shaped.

The invention furthermore provides a method for drilling a directional borehole in the ground using a BHA according to the invention.

The invention furthermore provides a method for drilling a directional borehole in the ground using a directional casing drilling system according to the invention, the method comprising the steps:

locking the BHA at the lower end of the casing string;
pumping a mud flow through the casing string to drive the mud drive at a constant rotational speed, and thus rotate the drilling position of the drill bit section at a constant rotational speed;
driving the casing string in a rotational direction contrary to the rotational direction the mud drive is driven by the mud flow;
drilling a borehole while running a casing string in the borehole, the drilling process comprising the steps:
driving the casing string at a rotational speed that differs from the rotational speed of the mud drive to drill a borehole along a linear trajectory;
registering the tool face orientation of the drill bit section and adjusting the rotational speed of the casing string to position the drill bit section at a predetermined tool face orientation;
driving the casing string at a rotational speed substantially similar to the rotational speed of the mud drive to drill a borehole along a curved trajectory;
stop pumping the mud flow through the casing string and stop rotating the casing string;
unlocking the BHA at the bottom end of the casing string and retracting the BHA through the casing string and out of the borehole.

Typically, the casing remains in the bore hole and is preferably cemented in the borehole to provide the borehole with a wall or lining. Preferably, the method comprises the use of a BHA according to the invention.

With a drilling system according to the invention, the position of the drill bit section is controlled by adjusting the rotation of the casing string. More in particular, the rotation of the casing string is used to counter balance the angular rotation of the drill bit section, to thus rotationally stabilize the drill bit section relative to the borehole and drill a borehole along a linear trajectory. Rotation of the casing string at a speed other than this static drive speed causes rotation of the drill bit section, and thus allows for adjusting the tool face orientation of the drill bit section. Continuously rotating the casing string at a rotational speed that differs from the rotational speed of the mud drive causes the drill bit section to continuously rotate about the longitudinal axis of the BHA, and thus drill a borehole along a linear trajectory.

The invention furthermore provides a method for introducing a BHA according to the invention in a casing string, and for retrieving said BHA from said casing string, the method comprising the steps:

lowering the BHA into the casing string;
locking the BHA at the lower end of the casing string;
pumping a mud flow through the casing string;
increasing the pressure in the drilling mud up to a working pressure, and thus pivoting the drill bit section of the BHA from an inactive position into a drilling position;
drilling a borehole or at least a section thereof;
decreasing the pressure in the drilling mud, and thus pivoting the drill bit section of the BHA from its drilling position into its inactive position; and
retracting the BHA through the casing string.

It is observed that the invention has been disclosed in combination with casing drilling. However, in the case of shallow wells, the drilling system according to the invention can also be used in combination with a drilling string instead of a casing string.

Advantageous embodiments of the drilling vessel according to the invention and the method according to the invention are disclosed in the subclaims and in the description, in which the invention is further illustrated and elucidated on the basis of a number of exemplary embodiments, of which some are shown in the schematic drawing.

BRIEF DESCRIPTION OF THE DRAWINGS

In the drawings:

FIG. 3 shows a close up of the bottom hole assembly of FIG. 2 in more detail;

FIG. 4 shows a further close up of the bottom hole assembly of FIG. 2 in more detail;

Further objects, embodiments and elaborations of the apparatus and the method according to the invention will be apparent from the following description, in which the invention is further illustrated and elucidated on the basis of a number of exemplary embodiments, with reference to the drawings.

DETAILED DESCRIPTION

Figure 1:
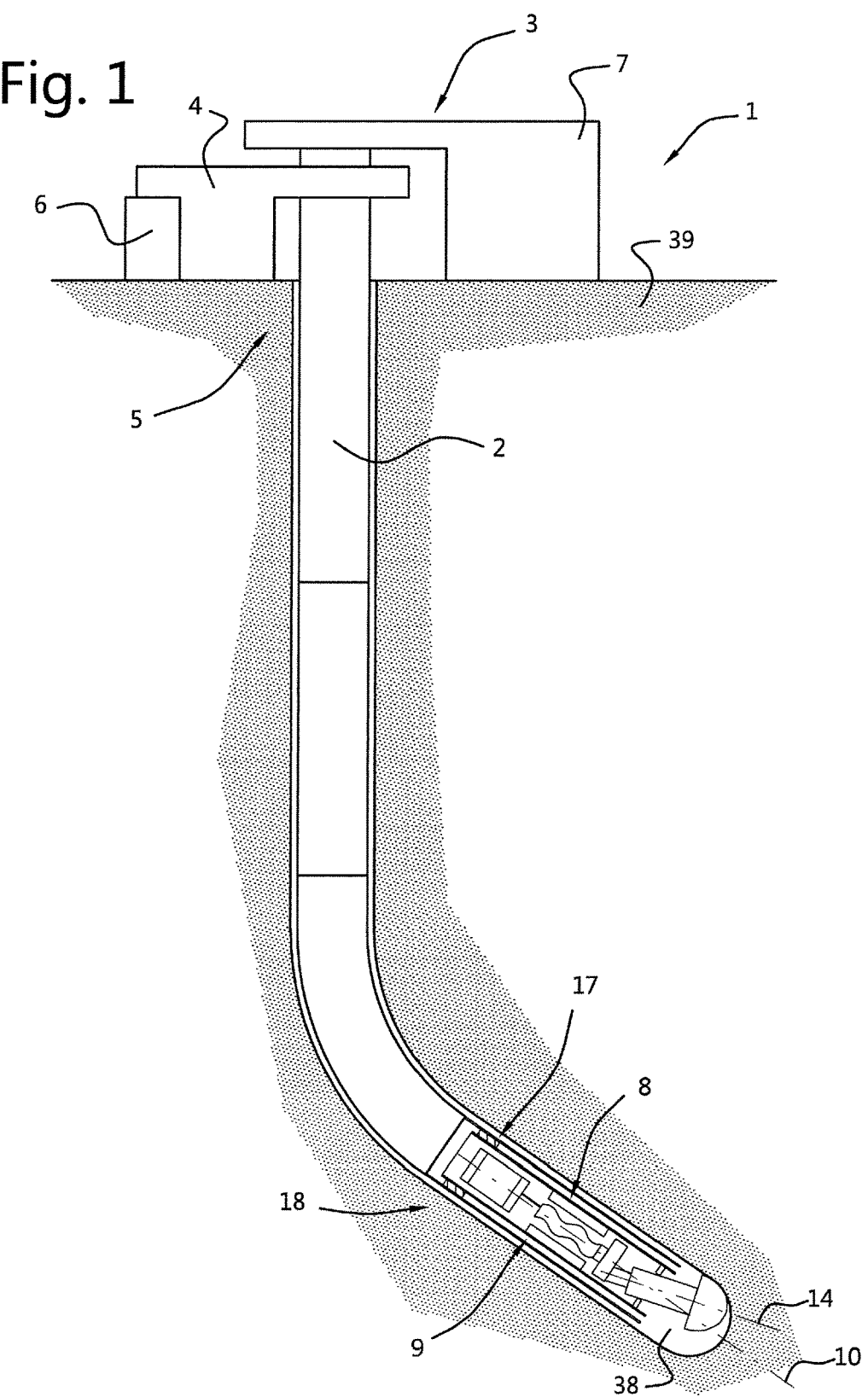
FIG. 1 shows a simplified depiction of a directional casing drilling system according to the invention.

FIG. 1 is a simplified depiction of a directional casing drilling system 1. The directional casing drilling system 1 is shown while drilling a directional borehole 38 in the ground 39. The directional casing drilling system 1 comprises a drilling rig 3, a casing string 2, and a Bottom Hole Assembly (BHA) 8.

Figure 2:
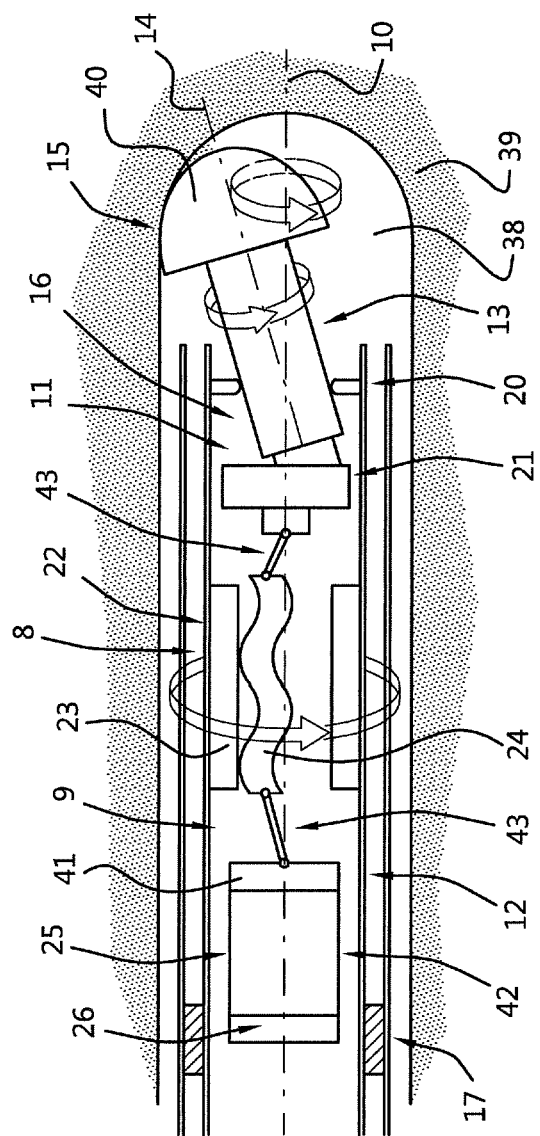
FIG. 2 shows a close up of the lower end of the drilling string with a simplified Bottom Hole Assembly in cross section.

FIG. 2 shows a close up of the lower end of the drilling string 2 with the BHA 8 in cross section. FIG. 3 shows a close up of the bottom hole assembly of FIG. 2 in more detail, and FIG. 4 shows a further close up of the bottom hole assembly of FIG. 2 in more detail. In FIGS. 1 and 2, the BHA is shown with its drill bit in a drilling position, and in the FIGS. 3 and 4 with its drill bit in an inactive position.

The drilling rig 3 is adapted to run the casing string 2, i.e. composing a string of casing tubulars, in a borehole 38. The drilling rig may be provided with devices such as a derrick or other type of construction configured for building a string 5 of casing tubulars and lowering the string into a borehole.

The drilling rig 3 is provided with a casing drive 4 for engaging an upper end of the casing string 5 to rotate the casing string in the borehole 38. The casing drive can be provided in the form of a known device which is used for rotating a casing string during casing drilling. However, according to the invention, the directional casing drilling system 1 is provided with a control system 6 for controlling the casing drive 4, which control system is configured for receiving and using information from the BHA 8. The control system 6 is provided above ground at the drilling rig 3, and is thus accessible by personnel while the BHA 8 is in the borehole 38.

The drilling rig is furthermore provided with a mud pump 7 for pumping a continuous flow of drilling mud into the casing string 2 while drilling the borehole. With casing drilling during the drilling process a flow of drilling mud, also referred to as drilling fluid, is guided through the casing string, through the BHA and via the drill bit into the bore hole. The drilling mud flows back to the surface along the outside of the casing string. The drilling mud is used to provide hydrostatic pressure in the borehole (to prevent formation fluids from entering into the well bore), to keeping the drill bit cool and clean during drilling, and to carry drill cuttings to the surface and out of the borehole.

The BHA 8 is similar to known BHA's of the "point the bit" system in that it has a torque transfer section 9 and a drill bit section 13, each having a longitudinal axis 10,14 extending between a rear end 12,16 and a front end 11,15 of the torque transfer section 9 and the drill bit section 13 respectively. At its front end 15, the drill bit section 13 supports a drill bit 40. The drill bit section 13 is received in the torque transfer section 9 at the front end thereof such that the front end 15 of the drill bit section 13 is located outside the torque transfer section 9 and the rear end 16 of the drill bit section 13 is located inside the torque transfer section 9.

The torque transfer section 9 of the BHA 8 comprises a locking system 17 adapted to secure the torque transfer section, and thus the BHA, in a lower end of the casing string 2 with at least the front end 15 of the drill bit section 13 extending outside the casing string. The locking system is configured to secure the BHA in a rotational sense as well as in a translational sense relative to the casing string. Furthermore, the locking device is configured for unlocking the BHA, such that the BHA can be removed, more in particular can be retracted through the casing string. It is observed that these types of locking devices for securing the torque transfer section of a BHA are known form the prior art, for example from WO 2013/100769.

The drill bit section 13 is at its front end 15 provided with a drilling bit 40 for drilling the borehole. In addition to the drilling bit, a reamer may be provided to enlarge the size of the borehole drilled by the drilling bit up to a diameter fit for receiving the casing string. Preferably, the reamer is a collapsible reamer to facilitate retracting the BHA through the casing string.

The drill bit section 13 is supported in the torque transfer section 9 by a gimbal device 20, which gimbal device 20 is located at the front end 11 of the torque transfer section 9

The gimbal device 20 supports the drill bit section 13 between the rear end 16 and the front end 15 of the drill bit section, such that the drill bit section can be gimballed with its longitudinal axis 14 relative to the longitudinal axis 10 of the torque transfer section 9. As is the case with known BHA's, the gimbal device allows for the drill bit section to be pivoted about two axis, which axis extend perpendicular to each other. Thus, the bit 40 of the drill bit section 13 can be positioned into multiple positions located at the same distance from the longitudinal axis 14 of the drill bit section, which multiple positions together form a circle of which the centre point is located on the longitudinal axis of the drill bit section. Furthermore, the drill bit section 13 is supported by the gimbal device 20 such that the drill bit section is non-rotational about its longitudinal axis 14 relative to the torque transfer section 9. The gimbal device 20 therefore supports the drill bit section 13 such that the front end 15 of the drill bit section 13, carrying the drill bit 40, can be rotated about the longitudinal axis 10 of the torque transfer section 9, i.e. can be moved along a circular trajectory, the centre point of which trajectory is located on the longitudinal axis 10 of the torque transfer section 9. Also, the gimbal device allows for both the torque transfer section and the drill bit section to be rotated about their respective longitudinal axis, while the drill bit is held in a constant position relative to the world.

The BHA 8 furthermore comprises an eccentric part 21 configured to hold the rear end 16 of the drill bit section 13 at a distance from the longitudinal axis 10 of the torque transfer section 9. The eccentric part 21 thus positions the drill bit section 13 in its drilling position. In this drilling position the longitudinal axis 14 of drill bit section 13 extends at an angle to the longitudinal axis 10 of the torque transfer section 9.

The eccentric part 21 is rotatably supported such that it can rotate the rear end 16 of the drill bit section 13 about the longitudinal axis 10 of the torque transfer section 9, i.e. can move the rear end 16 of the drill bit section 13 along a circular trajectory, the centre point of which trajectory is located on the longitudinal axis 10 of the torque transfer section 9. Thus, by rotating the eccentric part 21, the angular position of the drill bit section 13 relative to the transfer section 9 is continuously adjusted, and the drilling position of the drill bit section 13 is rotated about the longitudinal axis 10 of the torque transfer section 9.

The BHA furthermore comprises a mud drive 22, the mud drive comprising a stator 23 and a rotor 24. The mud drive 22 is provided between the part of the torque transfer section 9 that is fixed by the locking system in the casing string 2, i.e. the part of the BHA that is non-rotational relative to the casing string, and the eccentric part 21 of the torque transfer section 9, i.e. the part of the BHA that is rotational relative to the casing string 9. The stator 23 of the mud drive 22 is non-rotational relative to the torque transfer section 9 and the rotor 24 of the mud drive 22 is non-rotational to the eccentric part. When a borehole is drilled, the mud flow generated by the mud pump 7 flows through the casing string 2, through the BHA 8, and through the mud drive 22. The mud flow drives the mud drive 22, thus the central rotor of the mud drive is rotated, which in turn rotates the eccentric part 21, and thus rotates the drilling position of the drill bit section 13 about the longitudinal axis 10 of the torque transfer section 9.

It is noted that mud drives are typically used in BHA's for generating electric energy to power electronic equipment present in the BHA and/or to drive the drill bit. Regulated mud drives are used in known BHA's for controlling the position of the drill bit. These regulated mud drives are configured such that the rotational speed and/or the torque transfer of the mud drive can be adjusted during the drilling process to adjust the position of the drill bit section. Typically, the mud drives are provided with actuators and control systems to adjust the flow of drilling mud passing through the mud drive and/or adjust the torque output of the mud drive. Due to these actuators and control systems, these mud drives are complicated devices.

According to the invention, the BHA is provided with a simple, i.e. not regulated, mud drive 22, which is rotated at a substantially constant speed during the drilling process. The mud drive 22 rotates the drilling position of the drill bit section 13 in a rotational direction that is contrary to the rotational direction of the casing string 2, and therefore contrary to the rotational direction of the torque transfer section 9. Thus, when the drilling position of the drill bit section 13 is rotated relative to the torque transfer section 9 at a rotational speed of 100 rpm, and the casing string is also rotated at a rotational speed of 100 rpm, both rotational movements cancel each other out and the drill bit section is effectively held at a constant drilling position relative to the borehole.

According to the invention the mud drive is rotated at a substantially constant speed, which constant speed is preferably chosen such that it falls within the optimal working range of the mud drive. For example, for many known mud drives the optimal rotational speed lies in the range of 90 to 110 rpm. Such a mud drive is thus preferably rotated at a rotational speed of about 100 rpm. According to the invention, the drilling position of the drill bit section 13 relative to the torque transfer section 9 is controlled by adjusting the rotational speed of the casing string 2, and not by adjusting the torque delivery or the rotational speed of the mud drive. Therefore there is no need for a complicated mud drive.

The BHA furthermore comprises a measurement while drilling device 25 comprising a position determining device 41 adapted to register the tool face orientation of the drill bit, i.e. the Azimuth position and inclination of the drill bit relative to the world. The measurement while drilling device 25 further comprises a communicating device 26 for communicating the tool face orientation of the drill bit 40 to the control system 6 of the casing drive 4 to enable the control system to control the tool face orientation of the drill bit section 13, and thus of the drill bit 40, by adjusting the rotational speed of the casing string 2. In the embodiment shown, the communication device is configured to communicated with the control system using mud pulse telemetry. Alternative and/or additional communication systems known from the prior art suitable for providing communication between a BHA and a device located above ground can also be used.

Figure 5:
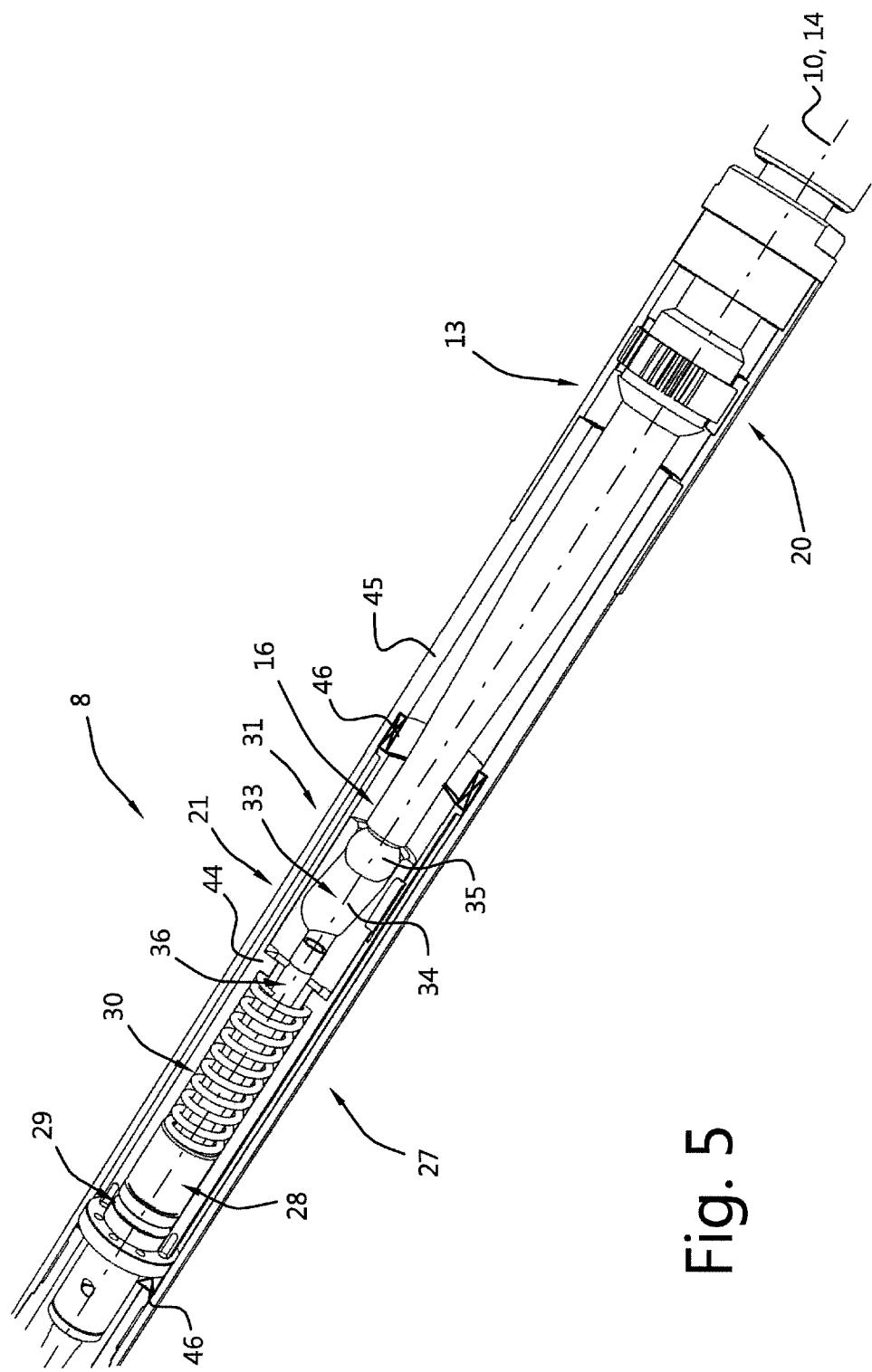
FIG. 5 shows a detailed perspective view in close up of the bottom hole assembly of FIG. 2.

In the particular embodiment shown, the eccentric part 21 of the BHA 8 is mounted to an angle adjustment system 27. The angle adjustment system 27 is configured to selectively pivot the drill bit section 13 between its drilling position and a passive position by moving the rear end 16 of the drill bit section. FIG. 5 shows the angle adjustment system 27 positioning the drill bit section 13 in its inactive position. In the inactive position the rear end 16 of the drill bit section 13 is located on the longitudinal axis 10 of the torque transfer section 9, and the longitudinal axis 14 of the drill bit section 13 is thus in line with the longitudinal axis 10 of the torque transfer section 9. In this position the BHA can be moved into, and through, the casing string.

In the active position the rear end 16 of the drill bit section 13 is offset from the longitudinal axis 10 of the torque transfer section, and the longitudinal axis 14 of the drill bit section 13 extends thus at an angle with the longitudinal axis 10 of the torque transfer section 9. In this position the drilling bit obstructs movement of the BHA into, and through, the casing string.

The angle adjustment system 27 comprises a piston 28, a pressure chamber 29, a biasing device 30, and a mechanical linkage device 31.

The pressure chamber 29 moveably holds the piston 28 such that the piston can move along the longitudinal axis 10 of the torque transfer section 9 between a first position and a second position in the pressure chamber.

In FIG. 5 the biasing device 30 forces the piston 28 into its first position. In the embodiment shown, the biasing device 30 is provided in the form of a resilient body, more in particular in the form of a helical spring provided about the piston. Alternative resilient elements can also be used, for example a resilient body such as a rubber body and/or a hydraulic cylinder.

The mechanical linkage device 31 connects the piston 28 via the eccentric part 21 with the rear end 16 of the drill bit section 13 such that when the piston is moved from its first into its second position, the drill bit section is pivoted from its inactive position into its active position, i.e. its drilling position. When the piston 28 is moved from its second into its first position, the drill bit section is pivoted from its active position into its inactive position.

In the particular embodiment shown, the mechanical linkage device 31 comprises a head part 33 connected with the piston 28. The head part 33 comprises a cam track 34, which cam track extends at an angle with the longitudinal axis 10 of the torque transfer section 9 between a first end, located radially inward and towards the rear end of the drill bit section, and a second end, located radially outward and at a distance from the rear end of the drill bit section. This second end, or more in particular the part of the head 28 comprising the second end of the cam track, thus forms the eccentric part 21.

Furthermore, a cam 35 in the form of a ball shaped head is provided at the rear end 16 of the drill bit section 13. The cam 35 is received in the cam track 34 such that when the piston 28 is moved from its first towards its second position, the head part 33 is moved towards the drill bit section 13, and the cam 35 is moved along the cam track 34 from a radially inward position towards a radially outward position. Thus the drill bit section 13 is pivoted from its inactive position into its active position. By reducing the pressure in the pressure chamber 29, the pistons 28 moves from its second position back into its first position and the drill bit section 13 is pivoted from its drilling position into its inactive position.

The pressure chamber 29 is provided with an opening 32 for guiding drilling mud, which drilling mud is pumped into the casing string 5 by the mud pump at the drilling rig, into the pressure chamber. When the pressure in the drilling mud is increased, for driving the mud drive and for transporting drilling debris to the surface, the pressure in the pressure chamber increases and the piston 28 is moved from its first position towards its second position. The biasing device 30 is configured such that during drilling operations the pressure of the drilling mud in the pressure chamber forces the piston in its second position. Thus, by bringing the pressure in the drilling mud up to the level for providing drilling activities, the drill bit section is pivoted from its inactive position into its active position.

Thus, the invention provides a simple and reliable positioning device for pivoting the drill bit section between its inactive and its drilling position, which positioning device can be controlled from outside the borehole by adjusting the pressure in the drilling mud in the borehole.

In the particular embodiment shown, the angle adjustment system 27 comprises a housing part 44 in which the piston 28 and the head part 33 are slideable supported, such that they can move in the longitudinal direction of the torque transfer section of the BHA. The housing 44 is in rotatably supported in the torque transfer section via bearings 46. Thus, the angle adjustment system 27, and the eccentric part 21 provided therein, can be rotated relative to the housing part 45 of the BHA.

In the particular embodiment shown, the cam 35 is furthermore provided with a stem, which stem is rotatably mounted in the drill bit section 13. Thus, the angle adjustment system 27, including the eccentric part 21 and the cam part 35 of the drill bit section 13, are rotatably mounted in the BHA. According to the invention, these components of the BHA can thus be held at a stationary position relative to the borehole by adjusting the rotational speed of the casing string.

In an alternative embodiment, the mechanical linkage device between piston 28 and drill bit section 13 is for example provided in the form of a linkage mechanism comprising one or more rods. In an exemplary embodiment, a rod is at one end hingeable connected to the piston and with its opposite end is hingeable connected to the rear end of the drill bit section to form a linkage mechanism with the piston and the drill bit section, which linkage system is configured such that when the piston is in its first position the longitudinal axis of the rod is in line with the longitudinal axis of the torque transfer section and with the longitudinal axis of the drill bit section, and when the piston is in its second position the rod extends at an angle to the longitudinal axis of the torque transfer section and with the longitudinal axis of the drill bit section, such that the drill bit section is positioned in its drilling position. Other configurations of the linkage device can also be used for providing a piston activated angle adjustment system that utilizes pressure in the drilling mud for positioning the drill bit section according to the invention.

It is noted that during the drilling bit process, the drilling bit section will always rotate about its longitudinal axis at the same rotational speed the casing string, with which it is connected via the torque transfer device, is rotated about its longitudinal axis. When the casing string is rotated, both the torque transfer section and the drill bit section will rotate about their longitudinal axis. At the same time, the drilling position of the drill bit section can be rotated about the longitudinal axis of the torque transfer section in a direction contrary to the rotational direction of the casing string. When the drilling position of the drill bit section is rotated synchronously, i.e. at the same number of revolutions per minute, with the torque transfer section but in the opposite direction, both rotational movements will cancel each other out and the drill bit will be held at a geostationary position relative to the borehole. While the drill bit is held in this geostationary position relative to the borehole, the BHA will drill a curved trajectory, the radius of curvature of which is determined by the angle between the longitudinal axis of the torque transfer device and the longitudinal axis of the drill bit section.

In the particular embodiment shown, the piston 28 comprises a central inner conduit 36 for channelling drilling mud from the pressure chamber 29 to the eccentric part 21 and into a conduit provided in the drill bit section 13, which conduit in the drill bit section guides the drilling mud to the drill bit 40. Furthermore, in the particular embodiment shown, the channel shaped cam track 34 is used for guiding the flow of drilling mud from the channel 42 into the conduit in the drill bit section via an opening provided in the cam head 35.

Thus the flow of drilling mud pumped into the casing string by the mud pump is channelled through the torque transfer section, along the measurement while drilling and through the mud drive, the angle adjustment system, and the drill bit section. The drill bit section is provided with openings adjacent and/or in the drill bit for guiding the flow of mud into the drilling hole. The invention thus not only provides a simple and robust angle adjustment system, the angle adjustment system also allows for guiding the mud flow through, from the mud drive into a conduit 19 provided in the drill bit section. More in particular, using the cam track for both positioning the drill bit section and for guiding the mud flow allows for a compact and robust angle adjustment system.

In the exemplary embodiment shown, the measurement while drilling device 25 is provided in an instrument section 42 that is rotatably fixed relative to rotor 24 of the mud drive 22. Thus, the measurement while drilling device 25 is rotatably fixed relative to the eccentric part 21, and thus relative to the drilling position of the drill bit section 13. Therefore, when the drill bit section 13 is held in a geostationary drilling position, i.e. when the BHA 8 is drilling a curved trajectory, the measurement while drilling device 25 is also held in a geostationary position, which enables the device to provide more accurate information regarding the position of the drill bit section.

In the particular exemplary embodiment shown, the rotor 24 of the mud drive 22 is at one end connected to the eccentric part 21, and is at its opposite end connected to the measurement while drilling device 25. Thus, the measurement while drilling device 25 is not only rotationally fixed relative to the drilling position of the drill bit section 13, it is also provided upstream of the mud drive with respect to the mudflow being pumped through the casing string 2 and the BHA 8 towards the drill bit 40. Thus, the mud drive 22 and the turbulence in the mud flow caused by the mud drive do not interfere with the information send to the top of the casing string, i.e. towards the control system 6 of the casing drive 4. This is beneficial when the measurement while drilling device 25 utilizes mud pulse telemetry to send information to the control system 6.

In an embodiment, the BHA 8 comprises a flexible hinge section 43 located between the rotor 24 of the mud drive 22 and the torque transfer section 9 and/or between the rotor 24 of the mud drive 22 and the eccentric part 21 to flexibly and rotatably support the rotor 24 of the mud drive 22 in the stator 23 of the mud drive 22. Such a flexible and rotatable support of the rotor is known from the prior art, and is used to allow for the rotor to freely move inside the stator up to a certain extend. In such an embodiment, the measurement while drilling device 25 is preferably provided in between the rotor 24 and the flexible hinge section 43 connected to the torque transfer section 9.

Figure 7A:
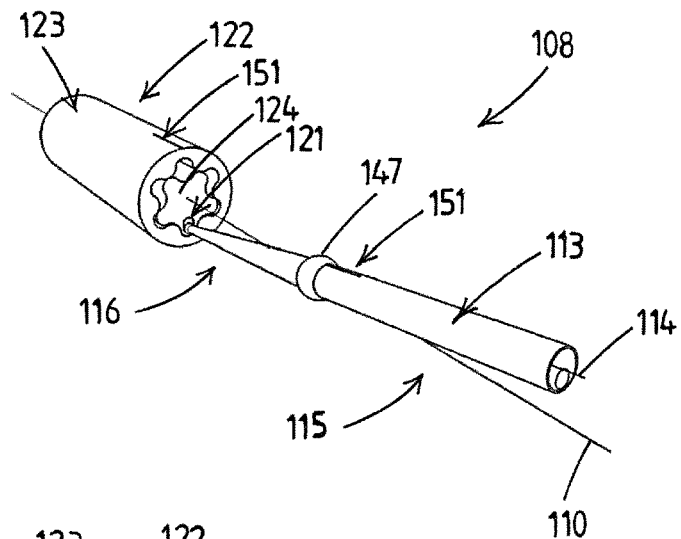
FIGS. 7a-c schematically show a configuration of a BHA according to the invention in different positions.
Figure 7B:
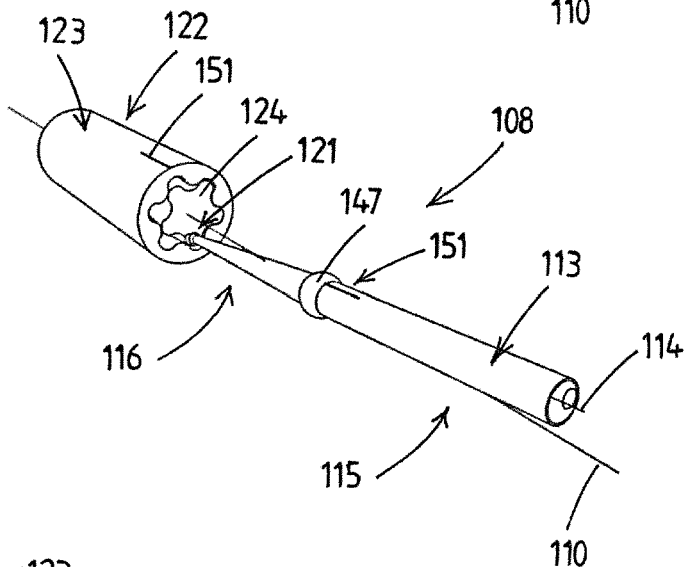
Figure 7C:
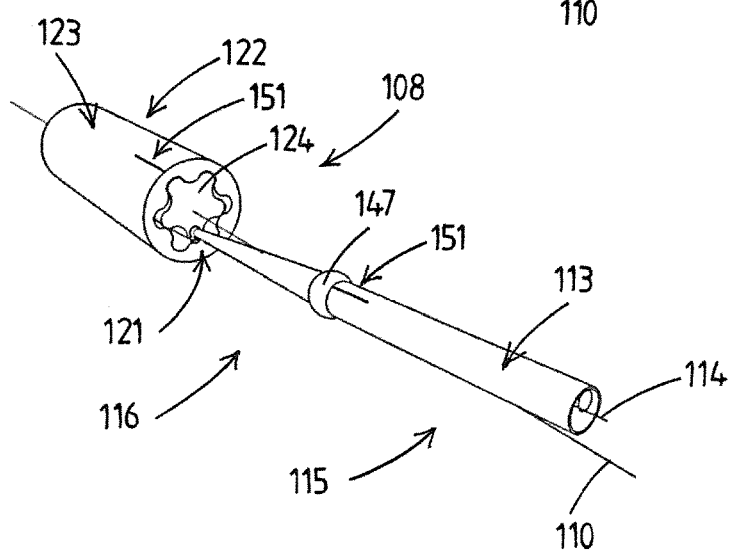

FIGS. 7a-7c schematically show an exemplary embodiment of a simplified BHA according to the invention, more in particular show a BHA 108 in which the rear end 116 of the drill bit section 113 is received in an eccentric part 121 that is directly coupled to the rotor 124 of the mud drive 122, see also FIG. 1. For the sake of clarity FIGS. 7a-c only show some components, i.e. the stator 123, rotor 124 and drill bit section 113, of the BHA. The eccentric part 121 is depicted as an integral part of the rotor 124, and not as a separate component coupled to the rotor.

The figures depict subsequent positions of the stator 123, rotor 124 and drill bit section 113. In this example, the casing, and thus the stator 123 and the drill bit section 113, are rotated counter clockwise when seen in frontal view. This is indicated in the figures by marks 151 provided on the stator and the drill bit section moving towards the viewer in the subsequent figures. At the same time, the flow of drilling mud causes the rotor 124 rotate about the central axis of the stator in a clockwise direction, and causes the rotor 124 to rotate about its own central axis in a counter clockwise direction.

In the exemplary situation shown, the drill bit section 113 is held at a constant drilling position, i.e. the rotation of the casing cancels out the rotation of the drilling position by the mud drive. More in particular, the combined movements of stator 123 and rotor 124 result in the rotor being held at a substantially constant position.

The figures show how in such an embodiment the wandering of the rotor 124 within the stator 123 translates into movement of the front end 115 of the drill bit section 113, and thus of the drill bit, about its longitudinal axis 114.

Thus, the frontal end 115 of the drill bit section 113 moves along a circular trajectory about the longitudinal axis 114 of the drill bit section, while the drill bit section is held in constant drilling position. However, it is also clear that this deviation of the front end 115 of the drill bit section 113 is small enough to not adversely affect the drilling process, more in particular will not cause the BHA 108 to deviate from the curved trajectory.

Figure 8A:
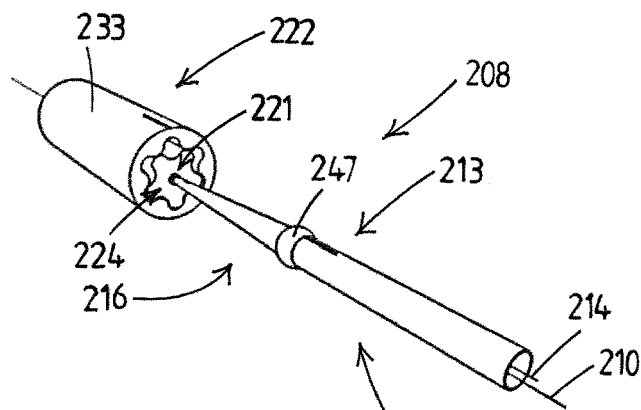
FIGS. 8 a-b schematically show a further configuration of a BHA according to the invention in different positions.
Figure 8B:
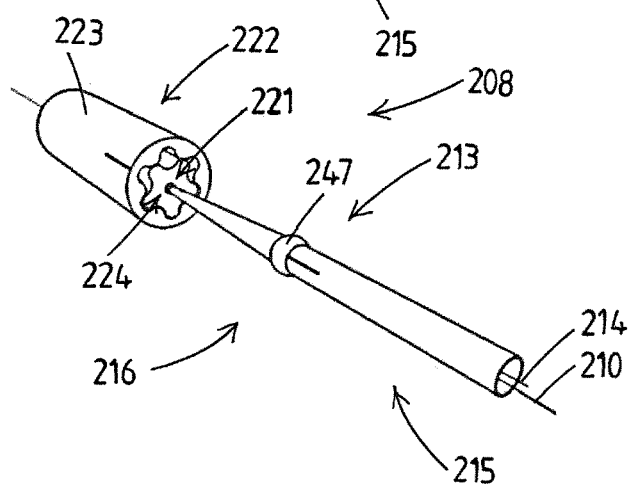

FIGS. 8a-8b schematically show an exemplary embodiment of a simplified BHA according to the invention, more in particular show a BHA 208 in which the rear end 216 of the drill bit section 213 is received in an eccentric part 221 that is directly coupled to the rotor 224 and wherein the rear end 216 of the drill bit section 213 is positioned at the center of the rotor 224. Thus, in this embodiment, the eccentric position of the rotor 224 in the stator 223 determines the eccentric position of the rear end 216 of the drill bit section 213 relative to the longitudinal axis of the stator, which coincides with the longitudinal axis 210 of the torque transfer section.

For the sake of clarity only some components, i.e. the stator 223, rotor 224 and drill bit section 213, of the BHA 208 are shown. The eccentric part 221 is depicted as an integral part of the rotor 224, and not as a separate component coupled to the rotor.

The figures depict subsequent positions of the stator 223, rotor 224 and drill bit section 213. In this example, the casing, and thus the stator 223 and the drill bit section 213, are rotated clockwise when seen in frontal view. At the same time, the flow of drilling mud causes the rotor 224 to rotate about the central axis of the stator in a counter clockwise direction, and thus causes the rotor 224 to rotate about its own central axis in a clockwise direction.

In the exemplary situation shown the drill bit section 213 is held at a constant drilling position, i.e. the rotation of the casing cancels out the rotation of the drilling position. More in particular, the combined movements of stator 223 and rotor 224 result in the rotor being held at a substantially constant position.

It is submitted that, due to the direct coupling between the eccentric part and the rotor, the drill bit may wander about its longitudinal axis while the drill bit section is held in specific position, i.e. while the BHA is drilling along a curved trajectory. As was already explained with respect to the previous exemplary embodiment, these deviations are too small to adversely affect the drilling process.

It is noted that although the stator 223 and rotor 224 in this embodiment rotate in directions opposite to the directions of the previous exemplary embodiment, their movements interrelate in the same manner. However, in contrast with the previous described embodiment, because the drill bit section 213 is supported at the center of the rotor 224, rotation of the drilling position, i.e. when the rotation of the casing is not matched with the rotation of the mud drive, is caused by the rotor 224 rolling along the inside of the stator 223, and not by the rotation of the rotor 113 about its central axis.

Although the way in which the movement of the rotor is translated into movement of the drilling position differs, in both embodiments the mud drive rotates the rear end of the drill bit section about the longitudinal axis of the torque transfer section. Therefore, in line with the BHA embodiments discussed earlier, the tool face orientation can be controlled by adjusting the rotational speed of the casing to which the BHA is connected.

The BHA configurations discussed with respect to FIGS. 7 and 8 provide a simplified design in which the eccentric part is coupled directly with the rotor of the mud drive. Thus there is no flexible hinge section in the form of for example a cardan joint provided between the eccentric part and the rotor. Instead, the movement of the rotor is directly linked to the movement of the eccentric part.

In these embodiments the eccentric part is fixed to the rotor directly. The rear end of the drill bit section may be hingeably supported in the eccentric part, for example using a ball joint or cardan joint. The eccentric part may furthermore be configured to pivot the bit section between an inactive position and a drilling position. in an alternative embodiment, the eccentric part is configured to support the drill bit in a drilling position only, not allowing for a no-active position of the drill bit section, to further simplify the design of the BHA.

Due to the direct coupling between the eccentric part and the rotor, the BHA is less complicated, which allows for reduced manufacturing costs and reduced chances of the BHA breaking down, when compared to more complicated BHA designs.

It is observed that the longitudinal axis of the torque transfer section and the longitudinal axis of the drill bit section are considered to be the central axis of the torque transfer section and the drill bit section respectively. It is noted that when the torque transfer section and/or the drill bit section are bent, for example caused by travelling along a curved trajectory, the longitudinal axis will also bent. However, these bents, if they occur, will be small compared to the length of the torque transfer section and the drill bit section respectively and therefore do not obstruct the working or technical principle of a BHA according to the invention.

It is furthermore observed that a casing string is a string of casing tubulars, which string is composed during the drilling process by successively adding a new casing tubular to the string while the drilling of the borehole progresses. After the borehole has been drilled, the casing typically is cemented into place in the borehole. With the casing drilling technique, the casing string is run during the drilling process and is used for driving the drill. This in contrast with drilling techniques in which the casing is lowered into the borehole after the borehole has been drilled.

In the exemplary embodiment shown, the drilling bit is fixed relative to the drill bit section. Thus, the rotational speed of the drill bit about the longitudinal axis of the drill bit section is substantially the same as the rotational speed of the casing string and the torque transfer section about their respective longitudinal axis. In an alternative embodiment, the drill bit section is provided with a mud drive to rotate the drill bit relative to the drill bit section. For example, in such an embodiment, the casing, and thus the drill bit section, can be rotated at a speed of 100 revolutions per minute by the casing drive, and the additional mud drive, driven by the mud flow passing through the drill bit section, can rotate the drill bit relative to the drill bit section at an additional 100 revolutions per minute, such that when the drill bit section is positioned geostationary position relative to the borehole, the drill bit rotates relative to the borehole at a rotational speed of 200 revolutions per minute.

The directional casing drilling system shown in the figures comprises a drilling rig 3, a casing string 2, and a BHA 8. The system can be used for drilling a directional borehole in the ground. The BHA 8 is locked in the casing string 2 at the lower end thereof, such that the front end 15 of the drill bit section 13 extends outside the casing string. By subsequently pumping a substantially continuous mud flow through the casing string 2, the mud drive is driven at a constant rotational speed. The mud pump and the mud drive are configured such that the continuous flow of drilling mud required for transporting drilling debris from the borehole during the drilling process, drives the mud drive at its optimal rotational speed, for example at 100 rpm, i.e. at a speed at which the behavior is predictable and reliable. The casing string is driven in a rotational direction contrary to the rotational direction the mud drive is driven by the mud flow. Typically, the drill bit is driven in a clockwise direction, when viewed in the drilling direction, and the casing string is driven in a counter clockwise direction.

During the drilling progress the casing string is run in the borehole by adding casing sections to the casing string while the borehole is being drilled.

The tool face orientation of the drill bit section is registered and communicated to the control system of the casing drive, located outside the borehole at the drilling rig. The control system can adjust the rotational speed of the casing string to bring the drilling bit section in a predetermined constant drilling position relative to the borehole, and thus drill a borehole along a linear trajectory, or continuously adapt the drilling position of the drill bit section relative to the borehole, by rotating the drilling position of the drill bit section relative to the borehole about the longitudinal axis of the torque transfer section of the BHA.

To drill a borehole along a linear trajectory, the casing string is driven at a rotational speed that differs from the rotational speed of the mud drive. The difference in rotational speed causes the drilling position of the drill bit section to rotate relative to the borehole about the longitudinal axis of the torque transfer section. Since the drill bit section is not held at a constant drilling position relative to the borehole, the drill bit does not drill a borehole substantially in line with the longitudinal axis of the drill bit section. Instead, the rotation of the drilling position of the drill bit section about the longitudinal axis of the torque transfer section causes the drill bit to drill a borehole along a trajectory substantially in line with the longitudinal axis of the torque transfer section. Thus a substantially straight borehole is drilled.

To drill a borehole along a curved trajectory, the casing string is driven at a rotational speed that is substantially similar, be it in the opposite direction, to the rotational speed of the mud drive, more in particular the rotational speed of the drilling position of the drill bit section. Thus the two rotational movements cancel each other out and the drill bit section is continuously held in a predetermined drilling position relative to the borehole. Since the drill bit section is held at a constant drilling position relative to the borehole, the drill bit drills a borehole substantially in line with the longitudinal axis of the drill bit section. The angle between the linear axis of the torque transfer section and the linear axis of the drill bit section causes the drill but to drill a borehole along a curved trajectory.

When the drilling of the borehole has finished, the mud pump stops pumping the mud flow through the casing string and the casing drive can stop rotating the casing string. Subsequently the BHA can be unlocked at the bottom end of the casing string and can be retracted through the casing string and out of the borehole.

When the drilling has been finished, and the BHA has been removed, the casing string is cemented in the borehole. It is noted that for drilling a borehole may comprise repeating such a process, i.e. drilling a first trajectory and cement casing in place, drilling a second trajectory, using casing that passes through the first casing string, and cementing the casing in place, etc.

It is observed that the BHA shown in FIGS. 1-5 comprises an angle adjustment system which enables the drill bit section to be pivoted from its drilling position into an inactive position to facilitate transporting the BHA through the casing string. The angle adjustment system is configured to be actuated by the pressure in the drilling mud. Thus, the invention provides a BHA having a simple technical design compared to known BHA's, and which is optimally configured to be controlled from the drilling rig.

In FIG. 5, the gimbal device 20 is also shown in more detail. In the particular embodiment shown, the gimbal device 20 comprises a ball joint, comprising a ball shaped part 47 mounted on the drill bit section 13 such that the longitudinal axis of the drill bit section coincides with the centre of the ball part. Furthermore a socket part 48 is provided, which socket part mounted in, and fixed relative to, the housing 45 of the torque transfer section. The intermeshing members of the ball part 47 intermesh with the intermeshing members of the socket part 48 such that the ball shaped part is pivotable received in the socket part.

In the embodiment shown the ball part 47 and the socket part 48 are provided with intermeshing members in the form of teeth. The teeth extend in substantially the longitudinal direction of the torque transfer section and the drill bit section respectively. The toothed ball joint 20 thus allows for the drill bit section 13 to be gimballed with its longitudinal axis 14 relative to the longitudinal axis 10 of the torque transfer section 9. The teeth provided on the ball part and the socket part rotationally secure the drill bit section relative to the torque transfer section such that the drill bit section can not rotate in the socket part about its longitudinal axis. The teeth therefore enable a torque to be transferred between torque transfer section and the drill bit section.

Figure 6:
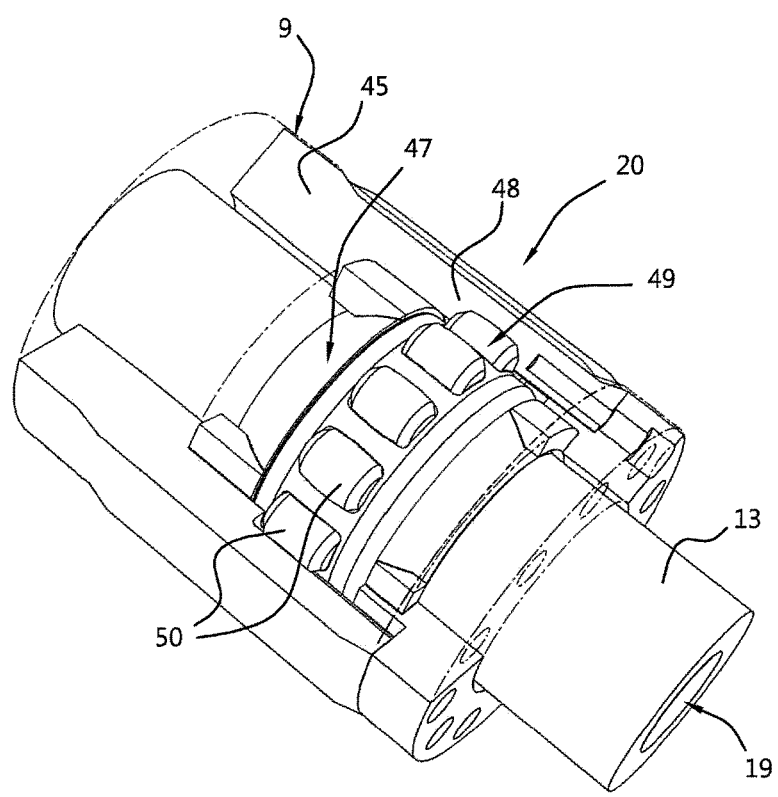
FIG. 6 shows a perspective view in cross section of an alternative gimbal device.

FIG. 6 shows an alternative embodiment of the gimbal device 20 supporting the drill bit section 13. In this embodiment the gimbal device 20 is a universal joint that uses a multitude of peg bodies 49. The peg bodies 49 are provided in sockets 50 located along the outer circumferential surface of a cylindrical ball joint 47 and along the inner circumferential body of a corresponding socket part 48. The peg bodies 49 are cylindrically shaped. The sockets 50 are configured to loosely receive one half of the peg bodies 49. The peg bodies 49 and sockets 50 extend in the longitudinal direction of the drill bit section 13 and the torque transfer section 9, when the longitudinal axis of the drill bit section coincides with the longitudinal axis of the torque transfer section. Thus, the peg bodies 49 lock the drill bit section 13 against movement in the longitudinal direction of the drill bit section 13 and the torque transfer section 9, prevent rotation of the drill bit section 13 about its longitudinal axis relative to the torque transfer section 9, and enable to transfer a torque between the torque transfer section 13, i.e. the socket 48, and the drill bit section 13, i.e. the cylindrical central part 47 of the gimbal device 20. The gimbal device can therefore be kept simple and robust, which allows for an increased durability and reduced chance of failure.

In a preferred embodiment, shown in FIG. 6, the gimbal device 20 of a BHA according to the invention is a universal joint with peg bodies 49 that are barrel shaped. In such an embodiment of a BHA according to the invention, the gimbal device is a universal joint comprising a ball joint received in a corresponding socket part, and a multitude of peg bodies, each peg body being provided in a socket located along the outer circumferential surface of, preferably a cylindrical part of, the ball joint and in a socket located along the inner circumferential body of the corresponding socket part.

The peg bodies and sockets extend in the longitudinal direction of the drill bit section and the torque transfer section, when the longitudinal axis of the drill bit section coincides with the longitudinal axis of the torque transfer section.

Preferably, the inner sockets, provided in the outside surface of the ball part of the universal joint, have a length substantially similar to the length of the peg bodies, and are shaped such that the peg bodies are more or less fixed in their position relative to the ball part of the universal joint. The outer sockets, provided in the inside surface of the socket part of the universal joint, preferably have a length substantially larger than the length of the individual peg bodies, such that the peg bodies can slide in the longitudinal direction through said outer sockets, to thus enable pivoting of the drill bit section.

Thus, the barrel shaped peg bodies prevent rotation of the drill bit section about its longitudinal axis relative to the torque transfer section, and enable to transfer a torque between the cylindrical ball joint and the socket of the gimbal device.

In an embodiment, the outer sockets have a contact surface, i.e. the surface along which the peg bodies slide, that extends along a curved trajectory, said curved trajectory extending in a plane comprising the longitudinal axis of the torque transfer section.

In an embodiment, the sockets have an essentially V-shaped cross section, such that the preferably barrel shaped peg bodies are supported by each side wall, and a peg body thus has two contact area's, one at each side wall, per socket.

In a further embodiment, the side walls of the sockets, i.e. the walls extending in the longitudinal direction of the torque transfer section and defining the V-shape, are curved, the concave surface having a radius of curvature, when seen in plane perpendicular to the longitudinal axis of the socket, that is larger than the radius of curvature of a cross section of the peg bodies.

Thus, in such an embodiment, the sockets, when seen in cross section, each comprises two curved side walls, the side walls having the same radius of curvature and together defining a V-shape. Preferably, the radius of curvature of these socket side walls, which support the peg bodies, is at least 10% larger than the radius of curvature of the outer surface of the peg bodies, when seen in cross section. Thus, the peg bodies only contact a limited area of the side walls.

In an embodiment of a BHA according to the invention the peg bodies are made of a plastic material while the parts of the gimbal device defining the sockets are made of a comparatively hard material, for example steel, such that the peg bodies are flexible compared to the pockets in which they are received. In a further embodiment, the peg bodies are made of a material comprising at least 85% PEEK, for example 90% PEEK, and preferably at least 4% Teflon, the peg bodies for example comprising 90% PEEK and 10% Teflon.

The gimbal device 20 shown in FIGS. 5 and 6, comprises the ball shaped part 47 which is received in the substantially ring shaped socket part 48. In the embodiment shown, the socket part 48 is cylindrical shaped, having a central aperture passing through it. In the central aperture the drill bit section 13 is received. The drill bit section 13 is provided with a cylindrical shaped circumferential surface in which the sockets 50 for the peg bodies are provided, and with a central conduit 19 for guiding drilling mud through the gimbal device 20 to a mud drive provided in the front end of the drill bit section for driving the drill bit.

The socket part 48 is along its inside surface provided with slot shaped sockets for receiving the peg bodies 49, more in particular for receiving the part of the peg bodies protruding from the sockets provided on the outside surface of the ball shaped part 48, and for allowing the these peg bodies, or at least the protruding part thereof, to slide through the sockets in the longitudinal direction of the torque transfer section.

The gimbal device furthermore has an interface between the ball shaped part and the socket part comprising surfaces for the transfer of axial forces between the torque transfer section and the drill bit section and for guiding the drill bit section while being pivoted relative to the torque transfer section. The guide surfaces, forming an interface between the hingeable connected components, are a typical part of a ball joint and lock the ball shaped part in position, while allowing for a pivotable relative movement.

At the front end of the gimbal device a removable component is secured with bolts to a sleeve shaped section of the socket part. The removable component can be removed to disassemble the gimbal device, i.e. to remove the drill bit section and the peg bodies located in the sockets on its outside surface, from the socket part. This for example allows for maintenance and/or replacement of the peg bodies, seals, etc.

It is submitted that the gimbal device can be embodied in many alternative ways, which given the information provided in this document lie within the scope of the skilled person. For example, the ball and socket shaped part can be provided with more or with less sockets holding peg bodies, with seals having other shapes. Also, for example, the socket and ball shaped part can be composed out of multiple components, for example comprising replaceable seals.

Figure 9:
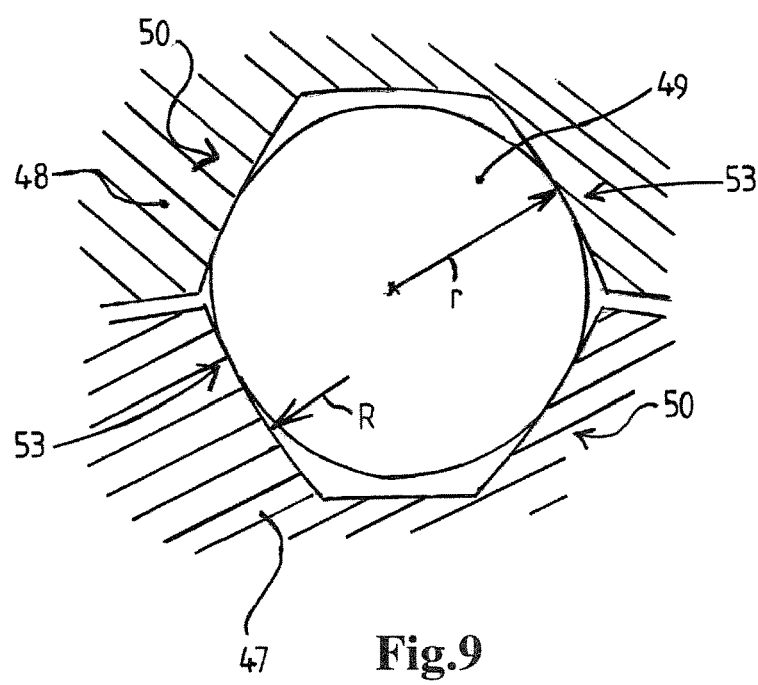
FIG. 9 shows an exemplary configuration of sockets of a ball joint of a point the bit type BHA according to the invention.

In the embodiment a BHA according to the invention shown, the gimbal device is provided with sockets 50 that have an essentially V-shaped cross section, see FIG. 9, such that the preferably barrel shaped peg bodies 49 are supported by each side wall 52, and thus have two contact area's 53, one for each side wall 52, per socket 50.

In a further embodiment, the side walls 52 of the sockets 50, i.e. the walls extending in the longitudinal direction of the torque transfer section, are concave, having a radius of curvature R, when seen in a cross sectional plane extending perpendicular to the longitudinal axis of the socket, that is larger than the radius of curvature r of a cross section of the peg bodies.

In such an embodiment the sockets, when seen in the cross sectional plane extending perpendicular to the longitudinal axis of the socket, each comprise two curved side walls, the side walls having the same radius of curvature. Preferably, the radius of curvature of these socket side walls is at least 10% larger than the radius of curvature of the outer surface of the peg bodies, when seen in cross section.

In an alternative embodiment, the BHA is provided with a drilling bit section which cannot be pivoted into an inactive position, or with an angle adjustment system of a different technical lay out, for example comprising a drive such as an electric drive or a regulated mud drive for pivoting the drill bit section between its drilling position an its inactive position. In case an angle adjustment system is absent, the drill bit section extends at a fixed angle relative to the longitudinal axis of the torque transfer section. In such an embodiment, the drill bit section may be configured to resiliently bent and to thus allow the BHA to be pulled into and through the casing when being removed from the borehole.

With respect to the mud drive of a BHA it is noted that the rotational speed of the rotor about its own central axis or about the central axis of the stator may not be one on one the rotational speed at which the rear end of the drill bit section is rotated about the longitudinal axis of the torque transfer section. The rotational speed at which the rear end of the drill bit section is rotated about the longitudinal axis of the torque transfer section for example depends on the configuration of the rotor and stator, for example the number of lobes on the stator, and on the way the rear end of the drill bit section is linked, via the eccentric part, to the rotor. For example, when the eccentric part holds the rear end of the drill bit section at the center of the rotor, generally the mud drive will rotate the rear end of the drill bit section at a different speed about the longitudinal axis of the torque transfer section than when the eccentric part holds the rear end of the drill bit section at a distance of the central axis of the rotor. When in this document is referred to the rotational speed of the mud drive, in particular in relation to the speed at which the casing is rotated, in most cases this refers to the speed at which the mud drive rotates the rear end of the drill bit section about the longitudinal axis of the torque transfer section.

Preferably, the drill bit section 13 is provided with a reamer 51, located between the gimbal device 20 and the drill bit 40, for reaming the bore hole while drilling, as is known in the art. In such an embodiment, the drill bit at the end of the drill bit sections drills a pilot hole that offers good directional control while the enlarged hole from reaming creates the right conditions for running the casing. In an embodiment, the reamer comprises downhole deployable arms and cutters, which arms and cutters can be retracted into the BHA, preferably the drill bit section of the BHA, to enable the reamer to pass through the narrow casing when the BHA is retrieved.

It is submitted that the longitudinal axis of the torque transfer section and the longitudinal axis of the drill bit section run at the center of these sections. The longitudinal axis can thus also be considered to be the central axis of the torque transfer section and the drill bit section.

From the foregoing, it will be clear to the skilled person, that within the framework of the invention as set forth in the claims also many variations other than the examples described above are conceivable.

The invention claimed is:

1. A directional casing drilling system to drill a directional borehole in the ground, the drilling system comprising:
   a casing string;
   a drilling rig adapted to run the casing string in a borehole, including a casing drive engaging an upper end of the casing string for rotating the casing string in the borehole, a control system for controlling the casing drive, and a mud pump for pumping a continuous flow of drilling mud into the casing string during a drilling operation; and
   a retrievable Bottom Hole Assembly (BHA), the BHA having a torque transfer section and a drill bit section, each having a longitudinal axis extending between a rear end and a front end of the torque transfer section and the drill bit section respectively,
   wherein the drill bit section supports a drill bit at the front end of the drill bit section, and wherein the drill bit section is received in the torque transfer section at the front end of the torque transfer section such that the front end of the drill bit section is located outside the torque transfer section and the rear end of the drill bit section is located inside the torque transfer section,
   wherein the torque transfer section of the BHA comprises:
      a locking system adapted to secure the torque transfer section in a lower end of the casing string with at least the front end of the drill bit section extending outside the casing string, the torque transfer section being secured relative to the casing string in a translational sense and a rotational sense;
      a gimbal device, located at the front end of the torque transfer section, wherein the gimbal device supports the drill bit section between the rear end and the front end of the drill bit section such that the drill bit section can be gimballed with the longitudinal axis of the drill bit section relative to the longitudinal axis of the torque transfer section, and the drill bit section is non-rotational against rotation about the longitudinal axis of the drill bit section relative to the torque transfer section;
      an eccentric part configured to hold the rear end of the drill bit section at a distance from the longitudinal axis of the torque transfer section, thus positioning the drill bit section in a drilling position, wherein the drill bit section extends at a first angle to the longitudinal axis of the torque transfer section, wherein the eccentric part is rotatably supported such that the eccentric part can rotate the rear end of the drill bit section about the longitudinal axis of the torque transfer section;
      a mud drive, the mud drive comprising a stator that is non-rotational relative to the torque transfer section and a rotor that is non-rotational to the eccentric part, such that the mud flow generated by the mud pump rotates the eccentric part, and thus rotates the drilling position of the drill bit section about the longitudinal axis of the torque transfer section; and
      a measurement while drilling device comprising a position determining device adapted to register the tool face orientation of the drill bit, a communicating device for communicating the tool face orientation of the drill bit to the control system of the casing drive to enable the control system to control a tool face orientation of the drill bit section by adjusting the rotational speed of the casing string.

2. The drilling system according to claim 1, wherein the measurement while drilling device is provided in an instrument section that is rotatably fixed relative to the rotor of the mud drive.

3. The drilling system according to claim 2, wherein the rotor of the mud drive is connected at one end to the eccentric part, and is connected at an opposite end to the measurement while drilling device, and
   wherein the measurement while drilling device is supported in the torque transfer section.

4. The drilling system according claim 3, wherein a housing of the measurement while drilling device is made of a material with a relative magnetic permeability of approximately 1.

5. The drilling system according to claim 1, wherein the casing string is a string of steel tubulars, the casing string having a bottom end that comprises a steel section for the BHA to lock into, and an aluminum or a composite tubular end section to provide a see through window in the casing string for the measurement while drilling device in the BHA.

6. The drilling system according to claim 1, wherein the torque transfer section is provided with one or more inner conduits for channeling the mud flow that is pumped into the casing string through the mud drive.

7. The drilling system according to claim 1, wherein the eccentric part is provided with one or more inner conduits for channeling the mud flow that is channeled through the torque transfer section to the drill bit section.

8. The drilling system according to claim 1, wherein the drill bit section is provided with one or more inner conduits, extending from the rear end to the front end of the drill bit section, for channeling the mud flow that is pumped into the casing string through the drill bit section.

9. The drilling system according to claim 1, wherein the gimbal device comprises a ball joint, comprising a ball shaped part mounted on the drill bit section such that the longitudinal axis of the drill bit section coincides with a center of the ball part, a socket part mounted in, and fixed relative to, the torque transfer section, wherein the ball part is pivotably received in the socket part, and
wherein the ball part and the socket part are provided with intermeshing members, wherein the intermeshing members extend in substantially the longitudinal direction of the torque transfer section and the drill bit section respectively.

10. The drilling system according to claim 1, wherein the gimbal device comprises a flexible body, wherein the flexible body is mounted on the drill bit section such that the longitudinal axis of the drill bit section coincides with a center of the flexible body, and wherein the flexible body is fixed to the torque transfer section.

11. The drilling system according to claim 1, wherein the system is configured to rotate the mud drive at a substantially constant speed in the range of 80 to 120 rotations per minute during the drilling process.

12. The drilling system according to claim 1, wherein the eccentric part of the BHA is furthermore mounted to an angle adjustment system to selectively bring the rear end of the drill bit section on the longitudinal axis of the torque transfer section, thus positioning the drill bit section in an inactive position, wherein, in the inactive position, the longitudinal axis of the drill bit section is in line with the longitudinal axis of the torque transfer section, and to bring the rear end of the drill bit section in an active position, wherein, in the active position, the rear end of the drill bit section is offset from the longitudinal axis of the torque transfer section, so that the angle adjustment system is configured to pivot the drill bit section between the inactive position and the drilling position, wherein the angle adjustment system comprises:
a piston;
a pressure chamber, wherein the pressure chamber moveably holds the piston, such that the piston can move along the longitudinal axis of the torque transfer section between a first position and a second position in the pressure chamber;
a biasing device, wherein the biasing device forces the piston into the first position; and
a mechanical linkage device that connects the piston via the eccentric part with the rear end of the drill bit section such that when the piston is moved from the first position into the second position, the drill bit section is pivoted from the inactive position into the drilling position and vice versa,
wherein the pressure chamber is provided with an opening for receiving drilling mud pumped into the casing string by the mud pump, and wherein the biasing device is configured such that during drilling operations the pressure of the mud in the pressure chamber forces the piston from the first position into the second position.

13. The drilling system according to claim 12, wherein the piston comprises one or more inner conduits for channeling drilling mud to the eccentric part.

14. The drilling system according to claim 12, wherein the mechanical linkage device comprises a head part connected with the piston, wherein the head part comprises a cam track, the cam track extending at a second angle with the longitudinal axis of the torque transfer section between a first end located radially inward and a second end located radially outward, and a cam in the form of a ball shaped head provided at the rear end of the drill bit section, wherein the cam is received in the cam track such that when the piston moves between the first position and the second position the cam is moved along the cam track.

15. The drilling system according to claim 12, wherein the mechanical linkage device comprises a rod, wherein the rod hingeably connected at one end to the piston and hingeably connected at an opposite end to the rear end of the drill bit section to form a linkage mechanism with the piston and the drill bit section, wherein the linkage system is configured such that when the piston is in the first position the longitudinal axis of the rod is in line with the longitudinal axis of the torque transfer section and with the longitudinal axis of the drill bit section, and when the piston is in the second position the rod extends at a third angle to the longitudinal axis of the torque transfer section and with the longitudinal axis of the drill bit section, such that the drill bit section is positioned in the drilling position.

16. A method for drilling a directional borehole in the ground using the directional casing drilling system according to claim 1, the method comprising the steps of:
locking the BHA at the lower end of the casing string;
pumping a mud flow through the casing string to drive the mud drive at a constant rotational speed, and thus rotate the drilling position of the drill bit section at a constant rotational speed;
driving the casing string in a rotational direction contrary to the rotational direction the mud drive is driven by the mud flow;
drilling a borehole while running a casing string in the borehole, the drilling process comprising the steps:
driving the casing string at a rotational speed that differs from the rotational speed of the mud drive to drill a borehole along a linear trajectory;
registering the tool face orientation of the drill bit section and adjusting the rotational speed of the casing string to position the drill bit section at a predetermined azimuth positon;
driving the casing string at a rotational speed substantially similar to the rotational speed of the mud drive to drill a borehole along a curved trajectory;
stopping pumping the mud flow through the casing string and stop rotating the casing string;

unlocking the BHA at the bottom end of the casing string and retracting the BHA through the casing string and out of the borehole.

17. A Bottom Hole Assembly (BHA) for use in a directional casing drilling system to drill a directional borehole in the ground, the BHA having a torque transfer section and a drill bit section, each having a longitudinal axis extending between a rear end and a front end of the torque transfer section and the drill bit section respectively,
wherein the drill bit section supports a drill bit at the front end of the drill bit section, and wherein the drill bit section is received in the torque transfer section at the front end of the torque transfer section such that the front end of the drill bit section is located outside the torque transfer section and the rear end of the drill bit section is located inside the torque transfer section,
wherein the torque transfer section of the BHA comprises:
a locking system adapted to secure the torque transfer section in a lower end of a casing string with at least the front end of the drill bit section extending outside the casing string, the torque transfer section being secured relative to the casing string in a translational sense and a rotational sense;
a gimbal device, located at the front end of the torque transfer section, wherein the gimbal device supports the drill bit section between the rear end and the front end of the drill bit section such that the drill bit section can be gimballed with the longitudinal axis of the drill bit section relative to the longitudinal axis of the torque transfer section, and the drill bit section is non-rotational against rotation about the longitudinal axis of the drill bit section relative to the torque transfer section;
an eccentric part configured to hold the rear end of the drill bit section at a distance from the longitudinal axis of the torque transfer section, thus positioning the drill bit section in a drilling position wherein the drill bit section extends at an angle to the longitudinal axis of the torque transfer section, wherein the eccentric part is rotatably supported such the eccentric part can rotate the rear end of the drill bit section about the longitudinal axis of the torque transfer section;
a mud drive, the mud drive comprising a stator that is non-rotational relative to the torque transfer section and a rotor that is non-rotational to the eccentric part, such that the mud flow generated by a mud pump rotates the eccentric part, and thus rotates the drilling position of the drill bit section about the longitudinal axis of the torque transfer section; and
a measurement while drilling device comprising a position determining device adapted to register the tool face orientation of the drill bit, a communicating device for communicating the tool face orientation of the drill bit to the control system of the casing drive to enable the control system to control a tool face orientation of the drill bit section by adjusting the rotational speed of the casing string,
wherein the eccentric part is coupled directly to the rotor of a mud drive.

18. The Bottom Hole Assembly (BHA) according to claim 17, wherein the BHA is a point the bit type BHA comprising an angle adjustment system to selectively bring the rear end of the drill bit section on the longitudinal axis of the torque transfer section, thus positioning the drill bit section in an inactive position wherein the longitudinal axis of the drill bit section is in line with the longitudinal axis of the torque transfer section, and to bring the rear end of the drill bit section in an active position wherein the rear end of the drill bit section is offset from the longitudinal axis, so that the angle adjustment system is configured to pivot the drill bit section between the inactive position and the drilling position.

* * * * *